(12) United States Patent
Sampath-Kumar et al.

(10) Patent No.: US 8,869,019 B1
(45) Date of Patent: Oct. 21, 2014

(54) METHOD AND APPARATUS FOR AUTOMATIC WEBSITE OPTIMIZATION

(71) Applicants: Srihari P. Sampath-Kumar, Cupertino, CA (US); Anindo Mukherjee, Fremont, CA (US)

(72) Inventors: Srihari P. Sampath-Kumar, Cupertino, CA (US); Anindo Mukherjee, Fremont, CA (US)

(73) Assignee: Captora Inc., Mountain View, CA (US)

( * ) Notice: Subject to any disclaimer, the term of this patent is extended or adjusted under 35 U.S.C. 154(b) by 0 days.

(21) Appl. No.: 14/207,388

(22) Filed: Mar. 12, 2014

Related U.S. Application Data

(60) Provisional application No. 61/860,715, filed on Jul. 31, 2013.

(51) Int. Cl.
*G06F 17/20* (2006.01)
*G06F 17/24* (2006.01)
*G06F 17/22* (2006.01)

(52) U.S. Cl.
CPC ............ *G06F 17/24* (2013.01); *G06F 17/2235* (2013.01); *G06F 17/2247* (2013.01)
USPC .......................................................... 715/208

(58) Field of Classification Search
CPC .................................................. G06F 17/2235
USPC ........................................ 705/14.6; 715/208
See application file for complete search history.

(56) References Cited

U.S. PATENT DOCUMENTS

| 7,260,774 B2 * | 8/2007 | Lambert et al. ............... 715/234 |
| 8,321,359 B2 | 11/2012 | Buchs et al. |
| 8,396,857 B2 | 3/2013 | Kamel et al. |
| 8,438,149 B1 * | 5/2013 | Dicker et al. ................ 707/706 |
| 2002/0038350 A1 * | 3/2002 | Lambert et al. ............... 709/217 |
| 2003/0046389 A1 * | 3/2003 | Thieme ......................... 709/224 |
| 2005/0060168 A1 * | 3/2005 | Murashige et al. ............... 705/1 |

(Continued)

FOREIGN PATENT DOCUMENTS

WO    WO/2014030039    2/2014

OTHER PUBLICATIONS

Graham Charlton, 12 Useful Tips for Web Form Optimization, Econsultancy, Jul. 4, 2013, downloaded at http://econsultancy.com/blog/62987-12-useful-tips-for-web-form-optimisation, 14 pages.

(Continued)

*Primary Examiner* — Cesar Paula
*Assistant Examiner* — Tyler J Schallhorn
(74) *Attorney, Agent, or Firm* — Blakely, Sokoloff, Taylor & Zafman LLP

(57) ABSTRACT

Web pages of a website are parsed and a set of n-grams are generated from the parsed web pages. A relevancy value is determined for each n-gram and a second set of n-grams is generated by removing any n-gram in the first set whose relevancy value is below a threshold. A third set of n-grams is generated at least by removing those of the second set of n-grams that have been determined to be similar to another one of the second set of n-grams. Responsive to determining that there is not a web page that is directed at an n-gram, a web page is automatically created with content directed at that n-gram including reusing existing content of the website that is related to the n-gram. One or more links to the created page are added to web pages so that the created page is not an orphan page.

24 Claims, 17 Drawing Sheets

(56) References Cited

U.S. PATENT DOCUMENTS

| | | | |
|---|---|---|---|
| 2007/0143283 A1* | 6/2007 | Spencer et al. | 707/5 |
| 2007/0168465 A1* | 7/2007 | Toppenberg et al. | 709/218 |
| 2008/0071766 A1* | 3/2008 | Grieselhuber et al. | 707/5 |
| 2009/0089110 A1 | 4/2009 | Lara et al. | |
| 2009/0094137 A1* | 4/2009 | Toppenberg et al. | 705/27 |
| 2009/0210409 A1* | 8/2009 | Levin | 707/5 |
| 2013/0332819 A1 | 12/2013 | Avritch et al. | |

OTHER PUBLICATIONS

Laura Moisei, 17 Examples of Lead Gen Forms Optimized for Conversion, Unbounce, downloaded at http://unbounce.com/conversion-rate-optimization/optimize-lead-gen-forms/ on Feb. 3, 2014, 19 pages.

\* cited by examiner

METHOD AND APPARATUS FOR AUTOMATIC WEBSITE OPTIMIZATION

CROSS-REFERENCE TO RELATED APPLICATIONS

This application claims the benefit of U.S. Provisional Application No. 61/860,715 filed Jul. 31, 2013, which is hereby incorporated by reference.

FIELD

Embodiments of the invention relate to the field of websites; and more specifically, to automatically optimizing a website.

BACKGROUND

There are millions of websites on the Internet which provide unprecedented access to information such as information about products and companies. A company creating a website faces many challenges when creating the website such as making the website easy to use, including relevant content for visitors, and visibility of their website. Owners or operators of websites are constantly trying to improve their websites to increase the visibility of their websites, increase engagement of their users, and increase the total amount of visitors to their website. By way of a specific example, the purpose of many websites is to generate sales leads. In order to generate sales leads, such websites have content that prospective customers would be interested in along with forms that the prospective customers need to fill out with their contact information in order to gain access to either some specific content or gain access to the use of some software or services or other resources. When prospective customers fill out such forms, they also give the website either explicit or implicit permission to contact them over email or phone or social media or other means either to sell a product or service to them or to send them relevant and interesting information about a product or a service. The submission of user data, such as contact information, may provide the business operating the website with a sales lead. Some prospective customers fill out such forms but many do not. The percentage of those website visitors who actually fill out such a form is referred herein as the "form fill rate" or "conversion rate." Owners or operators of websites with such forms are constantly trying to increase the "form fill rates" or "conversion rates" using different technologies and techniques.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, cooperate or interact with each other. "Connected" is used to indicate the establishment of communication between two or more elements that are coupled with each other.

A method and apparatus for automatically optimizing the performance of a website is described. In one embodiment, the website is automatically improved to increase user traffic to the website, increase user engagement of the website, increase a conversion rate for the website, fill a content gap of the website, and/or fill a reach gap of the website. The techniques described herein may automatically find areas where the website may be improved and take actions to improve the website.

In one embodiment the website optimization techniques described herein are part of a standalone software package that may be installed and run by individual website owners. In other embodiments, the website optimization techniques described herein can be offered as a service to website owners. Throughout this description, the term customer website may be used which refers to the website that is being optimized, but the techniques herein may be used by other websites other than customers of the website optimization service. For example it should be understood that a website owner may install software and execute software that performs the techniques described herein without being a customer of the website optimization service.

Figure 1:
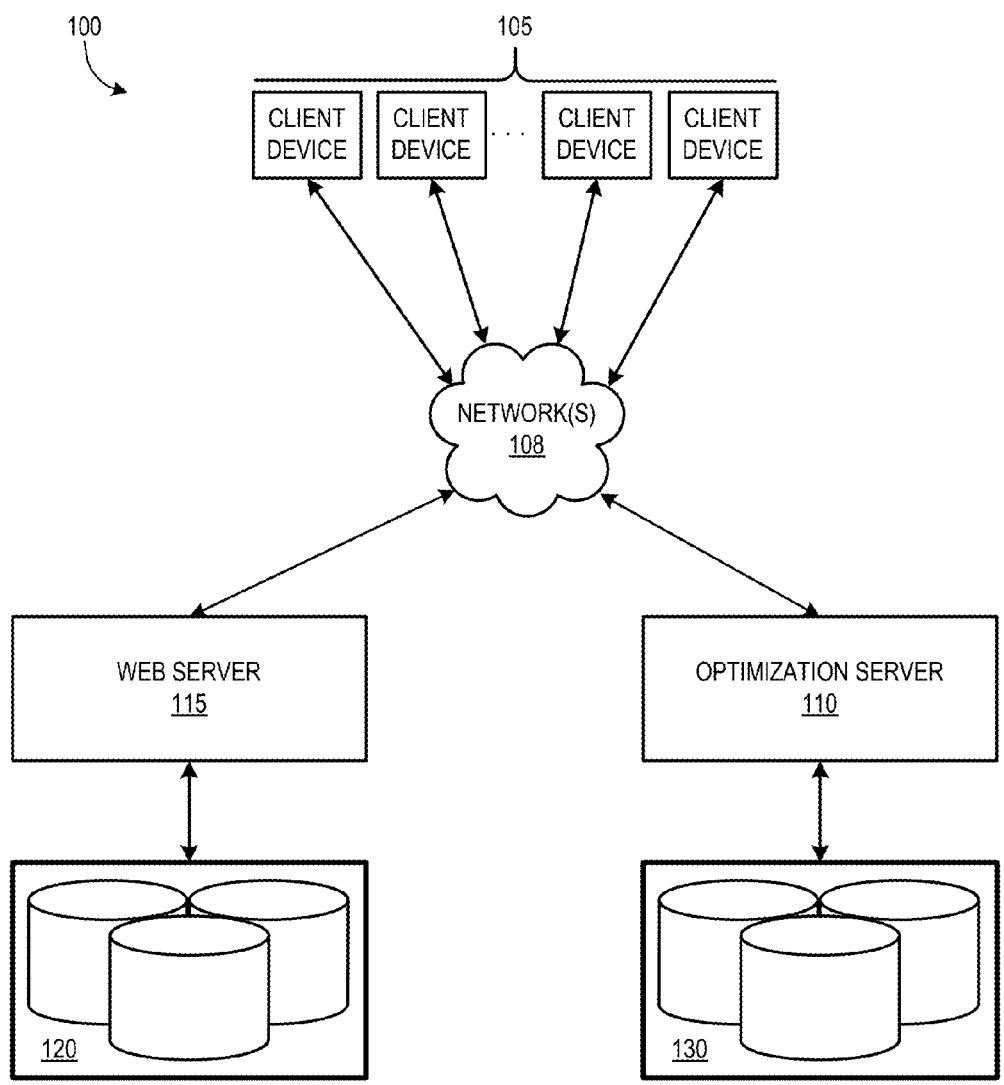
FIG. 1 illustrates, in block diagram form, exemplary system of networked devices in which webpage optimization may be implemented according to one embodiment.

FIG. 1 illustrates, in block diagram form, exemplary system 100 of networked devices in which webpage optimization may be implemented. Client devices 105 are coupled to network(s) 108 (e.g., a local area network or other private or publically accessible wide area network, such as the Internet). Via network(s) 108, client devices 105 access web server 115. Web server 115 delivers content to client devices 105 in response to client requests. For example, web server 115 may receive a request for a webpage, access a stored copy of the webpage in storage device(s) 120, and deliver the webpage to a client device 105. In one embodiment, storage device(s) 120 are separate from web server 115. Alternatively, storage device(s) 120 may be implemented as a portion of web server 115. The web server 115 may serve resources for the customer website.

System 100 further includes optimization server 110 coupled to network(s) 108. Optimization server 110 also accesses web server 115 and may receive webpages in a manner similar to the client device 105. For example, the optimization server 110 may crawl the website of the customer that is served at the web server 115. The optimization server 110 may store a local copy of the webpages and use the local copy to generate an updated version of the webpage as described further herein. In one embodiment, optimization server 110 stores the updated version of the webpage(s) in storage device(s) 130. In one embodiment, storage device(s) 130 are separate from optimization server 110. Alternatively, storage device(s) 130 may be implemented as a portion of optimization server 110. Additionally, while optimization server 110 is illustrated as a separate device from web server 115, in one embodiment, optimization server 110 is implemented within web server 115.

The updated version of the webpage may be delivered to client devices 105 in a number of ways. In one embodiment, web server 115 forwards or redirects requests for the webpage to optimization server 110 and optimization server 110 delivers the updated version of the webpage to client devices 105, e.g., from a copy stored in storage device(s) 130. In another embodiment, optimization server 110 transmits a copy of the updated version of the webpage to web server 115 and the updated version of the webpage is stored, e.g., in storage device(s) 120. In yet another embodiment, each of web server 115 and optimization server 110 deliver a portion of the updated version of the webpage to client devices 105. For example, the updated version of the webpage may include a multi-sequence form (which is described further herein). Optimization server 110 may deliver the multi-sequence form directly or indirectly (via web server 115) to client devices 105 while web server 115 delivers the remainder of the updated webpage to client devices 105.

Figure 2:
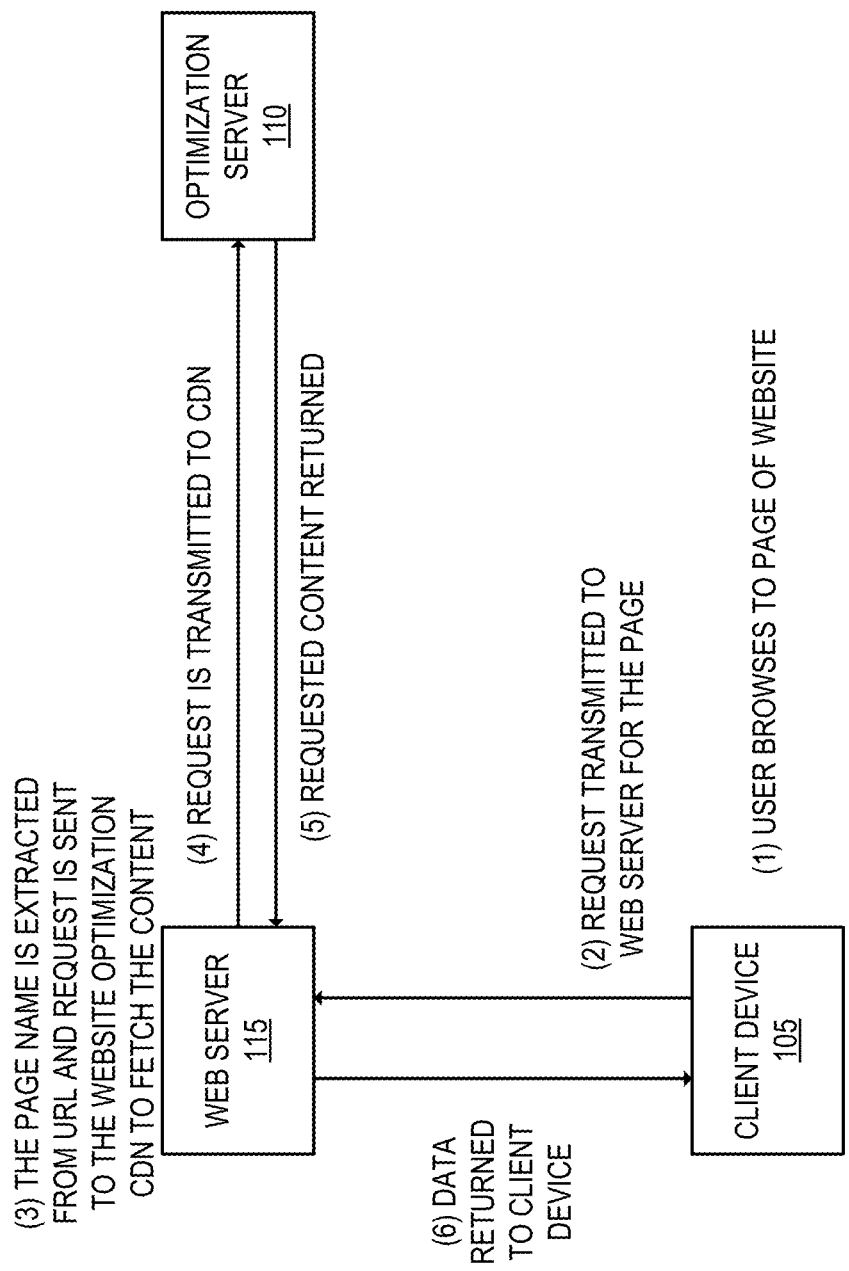
FIG. 2 is a block diagram that illustrates an exemplary architecture that may be used in some embodiments and illustrates a way for optimized content to be dynamically delivered by the optimization service.

FIG. 2 is a block diagram that illustrates an exemplary architecture that may be used in some embodiments and illustrates a way for optimized content to be dynamically delivered by the optimization service. At operation 1, a user at the client device 105 browses to a page of the customer website that is served at the web server 115. The browser of the client device 105 transmits a request to the web server 115 for the page at operation 2. At operation 3, the web server extracts the page name from the URL and generates a request to transmit to the optimization server 110 for certain optimized content which will be described in greater detail later herein (e.g., dynamic links to one or more pages, dynamic content for a multi-sequence form). At operation 4, the request is transmitted to the optimization server 110. The request may be an API call to the optimization server 110 and may be sent over a secure channel (e.g., over SSL). At operation 5, a response is received from the optimization server 110 with the requested content returned. At operation 6, the web server 115 returns the data to the client device 105. The optimization server 110 may be a node in a content delivery network (CDN).

Figure 3:
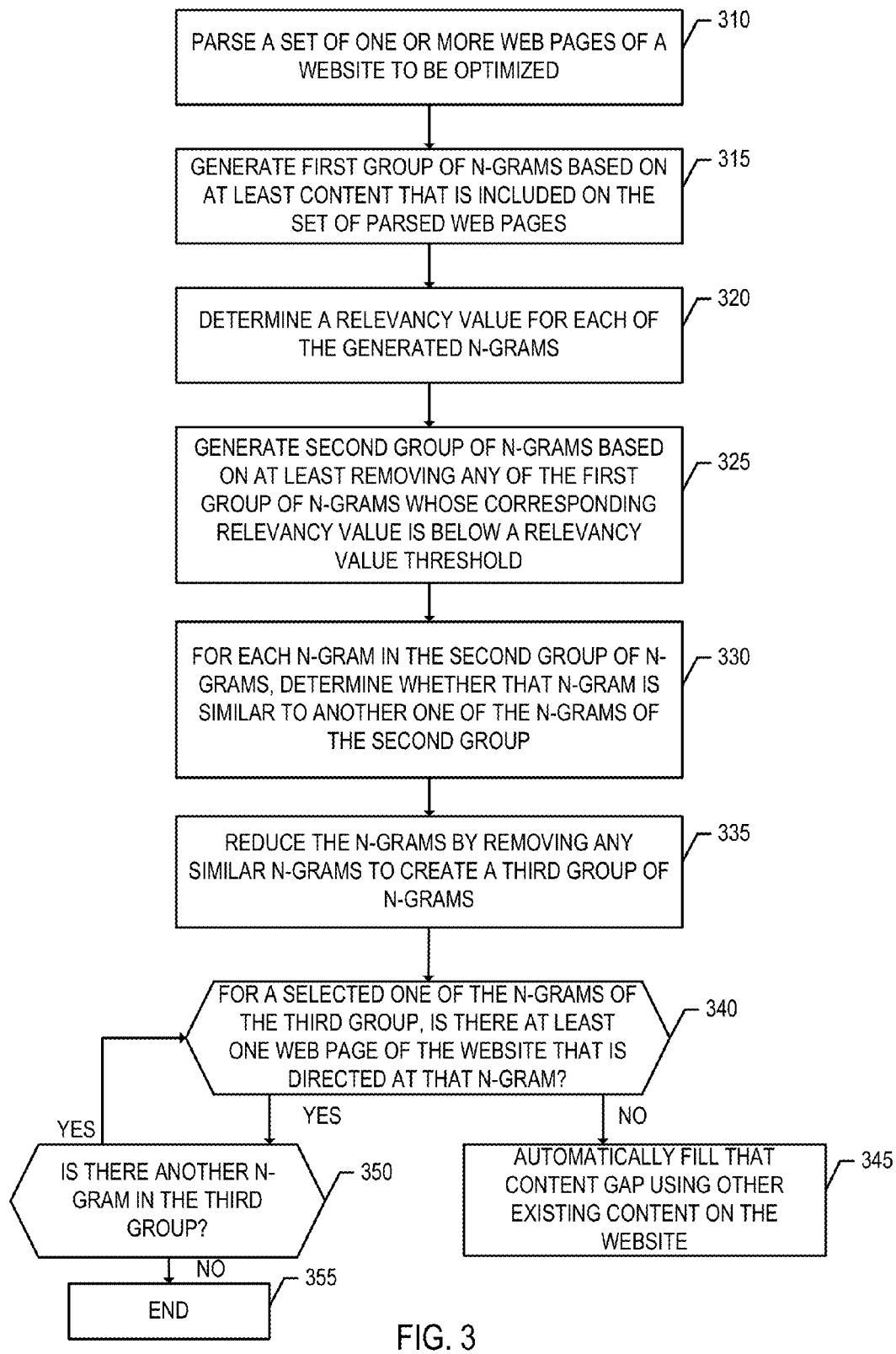
FIG. 3 is a flow diagram that illustrates exemplary operations for optimizing the performance of a website according to one embodiment.

FIG. 3 is a flow diagram that illustrates exemplary operations for optimizing the performance of a website according to one embodiment. The operations of this and other flow diagrams will be described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

At an operation 310, a set of one or more web pages of a website to be optimized is parsed by an optimization server 110. In one embodiment, all of the web pages of the website to be optimized are parsed by the optimization server 110 to create an index of the entire website. In other embodiments, a selected portion of the website (e.g., one or more web pages) are parsed by the optimization server 110 to create an index of only those portions. The selected portion (e.g., which web pages of the website) may be selected or configured by the website owner and/or an operator of the optimization service. The index of the customer website may be stored in storage device(s) 130. The parser of the optimization server 110 can be any suitable parser for parsing web pages.

Flow moves from operation 310 to operation 315 where the optimization server 110 generates a first group of n-grams based on at least content that is included on the set of web pages (e.g., that is in the created index of the web pages parsed). The content may include content that is viewable when displaying the web pages (e.g., when displaying on a browser) and content that is part of the code that makes up the web pages (e.g., the HTML code of the web pages). Example content includes the title, description, meta keywords, meta description, body, video titles, image titles, body, etc. An n-gram is a sequence of n items from a given sequence of text, which may be immediately contiguous. A unigram is an n-gram size of one (typically one word), a bigram is an n-gram size of two (typically two words), a trigram is an n-gram size of three (typically three words), and so on. By way of example, in the phrase "The quick brown fox jumped over the lazy dog" can be split into the following bigrams: {the quick}, {quick brown}, {brown fox}, {fox jumped}, {jumped over}, {over the}, {the lazy}, {lazy dog}. Stop words can also be removed when generating an n-gram. A stop word is a word that adds little meaning and is typically a common word. Example stop words may include: a, able, about, across, after, all, almost, also, am, among, an, and, any, are, as, at, be, because, been, but, by, can, cannot, could, dear, did, do, does, either, else, ever, every, for, from, get, got, had, has, have, he, her, hers, him, his, how, however, I, if, in, into, is, it, its, just, least, let, like, likely, may, me, might, most, must, my, neither, no, nor, not, of, off, often, on, only, or, other, our, own, rather, said, say, says, she, should, since, so, some, than, that, the, their, them, then, there, these, they, this, tis, to, too, twas, us, wants, was, we, were, what, when, where, which, while, who, whom, why, will, with, would, yet, you, your. For example, the word "the" may be removed from the above example such that {over lazy} is also a bigram.

In addition to generating n-grams based on at least the content that is included on the set of web pages, in some embodiments the optimization server 110 also generates n-grams of other website(s) (which may or may not be competitors of the website to be optimized) and/or generates n-grams from a list of related or similar terms to those n-grams. The generated n-grams may be stored in storage device(s) 130. Flow moves from operation 315 to operation 320.

As will be described in greater detail later herein, a refined version of the generated n-grams will be used by the optimization server 110 for automatically identifying areas of the website that can be improved and automatically attempting to improve those areas of the website. As examples of areas of the website that may be automatically optimized, as will be described in greater detail later herein, the customer website may have one or more content gaps, one or more reach gaps, one or more engagement gaps, and/or one or more conversion gaps that may be automatically identified and help corrected by the optimization server. A content gap may occur when the customer website does not have a web page that is dedicated to a particular topic that has been determined as being relevant to the customer and/or to competitors of the customer. A reach gap may occur when the customer website has content (e.g., a content gap does not exist) for a particular topic but is not ranking within a top results (e.g., within the top ten results) of one or more search engines or is not appearing in top results for social media (e.g., collaborative projects websites, blogs and/or microblogs, social news networking sites, content communities, social networking sites, etc.). A reach gap may be due to the website using a less than optimal title for their web pages, URL format for their web pages, and/or the title used in the anchor text (sometimes referred to as link title) for their web pages, for example. An engagement gap may occur when visitors to page(s) of the customer website do not stay very long on those page(s). A conversion gap may exist when a page of the website has a form that is not being filled out by very many visitors.

Figure 4:
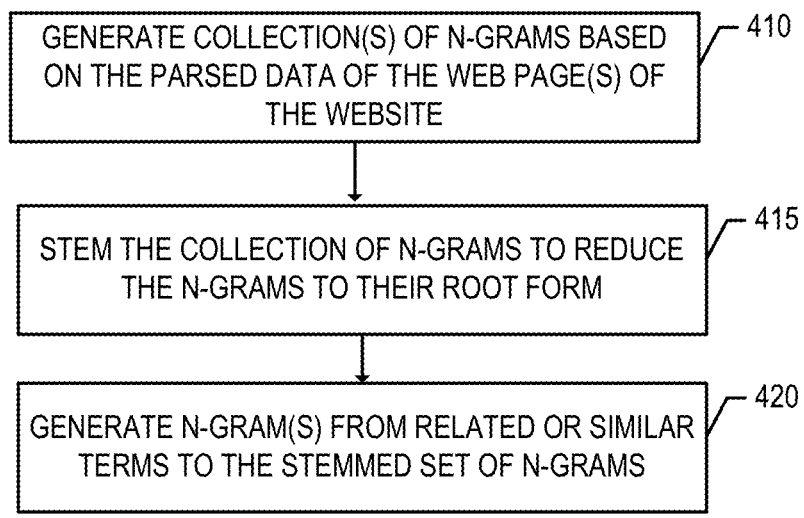
FIG. 4 is a flow diagram illustrating exemplary operations for generating the n-grams according to one embodiment.

FIG. 4 is a flow diagram illustrating exemplary operations for generating the n-grams according to one embodiment. In one embodiment the operations described in FIG. 4 occur after the parser has parsed the web pages of the website to be optimized. For example, in some embodiments, the operations of FIG. 4 are performed for operation 315 of FIG. 3. At operation 410, generates a one or more collections of n-grams based on the parsed data of the web page(s) of the website that is to be optimized. For example the optimization server 110 separates the parsed data into one or more collections of n-grams. In one embodiment the optimization server 110 may generate multiple collections of n-grams based on the same content. For example, the created index of the website may be represented in a first collection as bigrams and also may be represented in a second collection as trigrams. In one embodiment the selection of the type of n-grams (e.g., unigram, bigram, trigram, or other n-gram) to generate and/or the number of n-gram collections to create is configurable by the website owner and/or an operator of the optimization service. Generating the n-grams effectively creates a representation of the parsed web page(s) of the websites as a collection of one or more n-grams.

Prior to generating the one or more collections of n-grams based on the parsed data of the web page(s) of the website that is to be optimized, in one embodiment the optimization server 110 removes stop words from the parsed data. The list of stop words may be configured by the website owner and/or the operator of the optimization service. Alternatively to removing the stop words before generating the n-grams, n-grams can be generated and then those n-grams that include stop words can be removed.

Flow moves from operation 410 to operation 415 where the optimization server 110 performs a stemming procedure on the collection of n-grams to reducing the n-grams to their root form. By way of example, an n-gram that includes the word "running" may be stemmed to the root form "run." The optimization server 110 may use any suitable stemming procedure to stem the collection of n-grams. Example stemming procedures that may be used include the use of a stemming lookup table that maps root words to their expanded form, a suffix-stripping procedure that removes at least certain suffixes of a word (e.g., the suffixes "ing," "ed," "on," "ion," may be example suffixes that can be automatically removed), and/or the use of context aware stemmers.

Flow then moves to operation 420 where one or more n-grams are generated from related or similar terms to the stemmed set of n-grams. In one embodiment, the optimization server 110 includes a lookup table that maps n-grams with a set of one or more related or similar terms. The lookup table may be populated with information collected from Internet Service Providers (ISPs) that sell search data or through other means. In another embodiment, the stemmed set of n-grams are issued as queries to one or more search engines to find related search queries which may be candidates for addition into the set of n-grams that may be relevant to the website that is being optimized. For example, many search engines will suggest search queries that are related to an issued search query. These suggested search queries are typically popular search queries that have been issued and are similar to the issued search query. The resulting suggested search queries may be added may then be broken apart into one or more n-grams and flow can move back to operation 415. Alternatively, the stop words may be removed from the resulting suggested search queries and then added to the set of n-grams that may be relevant for the website that is being optimized.

Prior to issuing the stemmed set of n-grams to the one or more search engines, in some embodiments the optimization server 110 prepends and/or appends a set of one or more other key words to the n-gram. Prepending and/or appending a set of one or more other key words to the n-gram prior to issuing that n-gram to the search engine may help narrow the results to find related search results. The prepended and/or appended set of key words may be different depending on the website that is being optimized. For example, if the website that is being optimized is a website for email marketing, the words prepended and/or appended may be specific to email marketing. By way of example, the following word(s) may be prepended to the n-gram: "tips and tricks for", "resources for", "ideas for", "best practices for", "affordable", "open source", "free", "types of", "holistic", "advantages of", "benefits of", "importance of", "history of", "what is", "why", "how", "where", "when", and "which"; and the following word(s) may be appended to the n-gram: "vendors", "comparison", "definition", "ideas", "best practices", "for", "strategy", "lists", "reviews", "tips", "marketplace", "quotes", "self employed", "techniques", "basics", "company ratings", "quotes comparison", "market size", "engine", "models", "examples", "pricing", "advantages", "benefits", "template", "price points", "management", "software", "vs", "versus", and "definition." It should be understood that the word and phrases listed above for prepending and appending are exemplary and different words or phrases may be prepended and/or appended to an n-gram.

The operations of FIG. 4 may be performed for numerous other websites which may or may not be customers of the optimization service and may or may not be competitors of the website. Competitors of the website may be provided by the website owner/operator to the optimization service. For example, a website owner may provide domain(s) of its competitor(s) to the optimization server 110 which then will crawl that domain and generate n-grams as described with respect to FIG. 4.

The operations described with respect to FIG. 4 are performed periodically by the optimization server 110 according to one embodiment.

Generating the n-grams will typically create many different n-grams, some of which have more relevance than others to the customer website. The n-grams that have less relevance than others may not be used in some optimization techniques described herein or may be weighed lower than the n-grams that have more relatively more relevance. The relevance of a particular n-gram may take into account one or more factors including whether that n-gram is common across websites that are not related to the customer website (if the n-gram is common across other unrelated websites, then that n-gram will have low relevance), whether the n-gram is specific to only one or relatively few competitor websites, and/or a term frequency-inverse document frequency (TF-IDF) score applied to that n-gram.

With reference back to FIG. 3, at operation 320, the optimization server 110 determines a relevancy value for each of the generated n-grams. In one embodiment, determining a relevancy value for each of the generated n-grams includes performing a term frequency-inverse document frequency (TF-IDF) on each of the generated n-grams for the customer website. The TF-IDF analysis provides a value that indicates how important each of those n-grams is to the collection of the generated n-grams across the customer website and/or competitor website(s). The TF-IDF analysis is also done for each of the competitors of the customer website. If the TF-IDF value of a particular n-gram is below a threshold, which may be configurable by the website owner, that n-gram may be not be used in some optimization techniques described herein or may be weighed lower than n-grams that have a TF-IDF value above the threshold.

In one embodiment, determining a relevancy value for each of the generated n-grams includes determining a raw count of that n-gram on content on other non-competitor websites. For example, the raw count may be a count of each occurrence of that n-gram on the title and/or description of the content on the other non-competitor websites. If the count is above a threshold, which may be configurable by the website owner, then that is an indication that the n-gram is common across unrelated websites and therefore has less relevance than other n-grams. If the count is above the threshold for a particular n-gram, then that n-gram may not be used in some optimization techniques described herein or may be weighed lower than n-grams whose count is below the threshold.

In one embodiment, determining a relevancy value for each of the generated n-grams includes determining a raw count for each of those n-grams on content of the website that is being optimized and all of the other competitor websites. For example, the optimization server 110 may calculate this raw count as a count of each occurrence of that n-gram on the title and/or description of the content on the website that is being optimized and all of the other competitor websites. By way of example, if the n-gram is "marketing optimization," the raw count is the number of times that the n-gram "marketing optimization" occurs in the title and the description of the web pages of the website that is being optimized and the other competitor websites. If this raw count value for a particular n-gram is below a threshold, which may be configurable by the website owner, then that is an indication that the n-gram has less relevance than other n-grams that are above the threshold. If the count is below the threshold, then that n-gram may not be used in some optimization techniques described herein or may be weighed lower than n-grams whose count is above this threshold.

The relevancy value may take into consideration the number of times that n-gram is occurring in keywords for which the website that is being optimized and all of the other competitor websites is ranking at or near the top in one or more search engines in some embodiments. In one embodiment, the generated n-grams are issued as queries to one or more search engines to determine whether those n-grams are being ranked at or near the top in the results of one or more search engines. By way of example, an n-gram may be considered as being ranked if it appears in the top 10 results produced by a search engine. Of course the top 10 results is exemplary and another threshold of the top results may be used to determine whether an n-gram is considered to be ranking for that search engine. Prior to issuing the n-grams as queries to the search engine, the optimization server 110 may prepend and/or append a set of key words to certain ones of the n-grams as previously described herein.

The relevancy value may take into consideration a count of non-zero results for each n-gram occurring as a result of search queries for the website that is being optimized and the competitor websites. To say it another way, the number of search results from that website and the competitor websites when the search keyword is the n-gram is taken into consideration. An n-gram that appears in the top number of search results for multiple ones of these websites has higher relevance than an n-gram that does not appear in the top number of search results for multiple ones of these websites.

In one embodiment, determining a relevancy value for each of the generated n-grams includes determining whether that n-gram is used in one or more advertisements for the website that is being optimized and/or other websites. For example, a particular n-gram that is being used in advertisements relatively frequently will have a greater relevance than an n-gram that is not being used in advertisements or is not being used as much. In one embodiment, determining whether an n-gram is used in an advertisement includes issuing multiple searches for different keywords (those keywords may or may not include the n-gram) to search engine(s) and/or social media site(s) and analyzing the results to determine whether and to what extent a paid advertisement (e.g., a paid search advertisement) includes that n-gram. The optimization server 110 may maintain an index or other data structure of the paid advertisements that may be stored in storage device(s) 130.

In one embodiment, determining a relevancy value for each of the generated n-grams includes determining whether that n-gram is being used in social media (e.g., collaborative projects, blogs and/or microblogs, social news networking sites, content communities, social networking sites, etc.) and to what extent. For example, a particular n-gram that is being used in social media relatively frequently will have a greater relevance than other n-grams that are not being used in social media. In one embodiment, determining whether an n-gram is being used in social media includes issuing that n-gram as a search query to different social media sites and analyzing the result.

In one embodiment, determining a relevancy value for each of the generated n-grams includes determining a rate at which that n-gram is converting at the website that is being optimized (form fill conversion) versus rates at which other n-grams are converting at the website. For example, and as will be described in greater detail later herein, the optimization service 110 tracks the n-grams that are used in queries that lead to a webpage that includes a form and tracks the rate at which that n-gram is converting (form fill converting). For example if a website visitor visits a web page with a form as a result of a issuing a query to a search engine that contains or matches a particular n-gram, the optimization server 110 tracks the rate at which that form is being completed and associates that rate with that n-gram. An n-gram that is converting at a higher rate than other n-grams will be given a greater score than those other n-grams.

In one embodiment, determining a relevancy value for each of the generated n-grams includes determining for each of those n-grams what part of the content that n-gram is included in the website that is being optimized and/or competitor websites. For example, an n-gram that is included in the URL of a page may be given a higher value than n-grams that are not included in the URL of a page. As another example, an n-gram that is included in the title of a page may be given a higher value than n-grams that are not included in a title of a page. As another example, an n-gram that is included in anchor text of a page may be given a higher value than n-grams that are not included in anchor text of a page. As another example, an n-gram that is included in only the description of the pages may be given a lower value than n-grams that appear in different locations (e.g., URL, title, or anchor text).

In one embodiment, determining a relevancy value for each of the generated n-grams includes a combination of the following: the number of times that the n-gram appears in the content of the customer website where different places in the content may receive different weights (e.g., an n-gram that appears in the title may receive more weight than other n-grams), the number of websites (of the number of websites (of the customer website and the competitor website(s)) for which the n-gram occurs at least once in a title (this may be an approximation of the n-gram where words at a particular distance are also counted (e.g., for the n-gram "A B", the phrase "A C B" may be counted as a match), the number of times the n-gram occurs within a top search results (e.g., within the top ten results) for the customer website and the competitor website(s), the term frequency of the n-gram for all websites that have been crawled.

The final relevancy value may take into consideration any or all of the above described factors in some embodiments. Regardless of the factor(s) chosen, a relevancy value for each of the generated n-grams is determined. Flow moves from operation 320 to operation 325 where the optimization server 110 generates a second multiple of n-grams based at least on removing any of the first multiple of n-grams whose corresponding relevancy value is below a relevancy value threshold. In one embodiment the relevancy value threshold is configurable by the website owner and/or the operator of the website optimization service. In one embodiment, if the term frequency of the n-gram for all websites that have been crawled (which may include very large websites such as online encyclopedias for example) is above a threshold, that n-gram may also be removed. Flow then moves from operation 325 to operation 330.

At operation 330, for each of the remaining n-grams, the optimization server 110 determines whether that n-gram is similar to another one of the remaining n-grams. In one embodiment, the optimization server 110 determines whether an n-gram is similar to another one of the n-grams by analyzing the same number of results of a search query for that n-gram against the search results of the other n-grams. By way of example, the number of results may be the top 10 organic search results and/or the paid search results. Of course the number of the result is exemplary and another threshold of the top results may be used to determine whether an n-gram is considered to be similar to another one of the n-grams. By comparing the results of the search queries of the n-grams, a similarity score can be determined. For example, if the amount of overlap of two different searches (an overlapping search result may be defined as the same URL being returned as a search result for the different queries generated from the n-grams) is over a certain threshold, then those n-grams are determined to be similar (if they are below a threshold, then those n-grams are not determined to be similar). Flow moves from operation 330 to 335.

An n-gram that has been determined to be similar to another one of the n-grams is effectively treated by the optimization server 110 as being duplicate or redundant. As such, only one of those n-grams needs to be included in the optimization process. As a result, at operation 335, the optimization server 110 reduces the number of n-grams by removing similar n-grams to create a third group of n-grams. For example, if the n-gram "marketing automation solutions" has been determined to be similar to the n-gram "marketing automation software," then the optimization server 110 removes one of the n-grams from the optimization process described herein. In one embodiment, the n-gram that remains is the n-gram with the highest relevancy value. Flow then moves from operation 335 to operation 340.

At operation 340, for at least one of the remaining n-grams, the optimization server 110 determines whether there is at least one of the set of web pages of the website that is directed at content regarding that n-gram. Determining whether there is a web page that is directed at content regarding that n-gram may take into consideration several factors including whether that n-gram is included in the URL of a web page, whether that n-gram is included in the title of a web page, whether that n-gram is included with a frequency over a certain threshold of a web page, and/or whether that n-gram is included in other types of data of the website (e.g., included in a video, included in a whitepaper or PDF, etc.). If there is not a page that is directed at content regarding that n-gram, then the optimization server 110 determines that there is a content gap for that n-gram and flow moves to operation 345 to automatically fill that content gap. If there is a page directed at content regarding that n-gram, then flow moves to operation 350 where the optimization server 110 determines whether there is another n-gram in the remaining set of n-grams. If there is, then flow moves back to operation 340; otherwise flow moves to operation 355.

There may be several reasons why there is a content gap for a particular n-gram on the website that is being optimized. As one example the website may actually have content regarding that n-gram but instead of having a dedicated page regarding that n-gram, that content may be spread around various web pages of the website. Typically a page that has a dedicated page for a particular n-gram will have more visitors, a higher engagement, and a higher conversion rate (if that page includes a form) than if the content for that n-gram is spread across various pages of the website. Thus, a website owner may be providing products or services related to a particular n-gram but there website may not have a page that is dedicated to that n-gram. Also if there is a content gap for an n-gram then it is likely that the website is not ranking very high in search engine results for that n-gram.

After determining that there is a content gap for the n-gram, the optimization server 110 takes steps to automatically fill that content gap. In one embodiment automatically filling the content gap includes the optimization server 110 automatically creating a page for that n-gram and inserting existing content relative to that n-gram on the page where the existing content may be spread across multiple web pages of the website.

Figure 5:
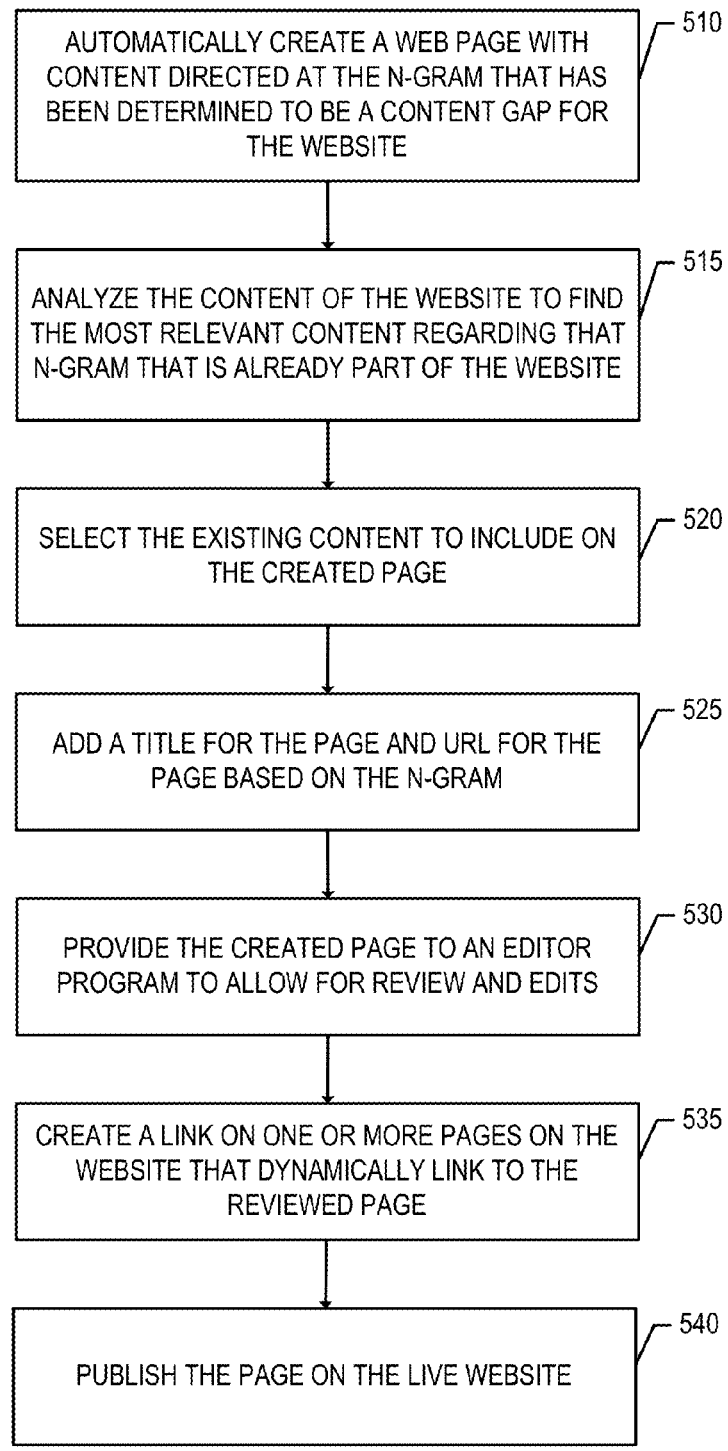
FIG. 5 illustrates exemplary operations performed by the optimization server to automatically fill a content gap according to one embodiment.

FIG. 5 illustrates exemplary operations performed by the optimization server 110 to automatically fill a content gap according to one embodiment. The operations of FIG. 5 may be performed for the operation 345 of FIG. 3 in some embodiments. At operation 510, the optimization server 110 automatically creates a web page with content directed at the n-gram that has determined to be a content gap for the website. In one embodiment, the created web page includes a same template and styles as other web pages of the website and also the same navigation structure as other web pages of the website. This is done so that the created web page has a consistent page layout as compared with other web pages of the website. In one embodiment the default layout to be used is configured by the customer. The customer may also specify multiple layouts and specify which layout to use for specific pages. Flow then moves to operation 515.

At operation 515, the optimization server 110 analyzes the content of the website to find the most relevant content regarding the n-gram that is already included on the website. For example, the optimization server 110 may use the TF-IDF score of the n-gram on the various web pages to locate the most relevant content regarding the n-gram. The optimization server 110 may locate many different portions of the website, which may be on multiple web pages, that has content that is relevant for that n-gram. Flow then moves to operation 520.

At operation 520, the optimization server 110 selects the content to include on the related page. It should be understood that the selected content may include content other than the actually n-gram. For example, the selected content typically includes sentences surrounding the n-gram and may include one or more paragraphs in which the n-gram appears frequently and/or has a high TF-IDF score. The selected content need not be limited to text included in the HTML of the website. For example the selected content may include media (e.g., an image, a video, and/or an audio clip), PDF documents, presentation documents, spreadsheet documents, word processing documents, etc. There may be multiple selections of content from different pages. In one embodiment, the optimization server 110 selects a certain number (e.g., three) most relevant pieces of content, which may be configurable by the website owner. Flow then moves to operation 525.

At operation 525, the optimization server 110 adds a title for the page and establishes a URL for the page. The title and the URL each include the n-gram. In one embodiment, the title is exactly the n-gram. For example, if the n-gram is "marketing automation solutions," the title may be set as "Marketing Automation Solutions" and the URL may be set as <www.example.com/marketing-automation-solutions> where example.com is the domain of the website that is being optimized. Flow then moves to operation 530.

Since the optimization server 110 automatically created the page including automatically finding content for the page, the page may need to be reviewed by a human to determine if anything needs refining or changing. At operation 530, the created page is provided to a graphical editor for an operator of the website owner to review and/or refine the created web page. In one embodiment the graphical editor is a What You See Is What You Get (WYSIWYG) HTML editor. The graphical editor allows the operator of the website to change any content as he or she desires. The graphical editor also allows the operator of the website to add one or more links on their website to the created page. The operator of the website may be automatically notified (e.g., through email, text message, phone call, or other ways) whenever a page has been automatically created and needs review. After the review has completed, flow moves from operation 530 to operation 535.

At operation 535, the optimization server 110 creates a link on one or more pages on the website that dynamically links to the reviewed page. As more pages are automatically created for the website (e.g., to fill a different content gap) more links may be added to the website. In one embodiment these link(s) are added dynamically to the page upon request. For example, the pages of the website may be modified to include a placeholder for these links (they may be placed in any location on the site but are typically included in a sidenav or footer) and modified to include a client-side script (e.g., JavaScript) that makes a call to a server of the optimization service for a piece of HTML (e.g., a widget). The placeholder may be included on every page of the website or particular pages of the website. The call includes a URL of the page making the call. The server receives the call and determines the piece of HTML to return that corresponds to the URL, and returns that code to the requesting client device. This server side integration allows the optimization service to make changes to the set of links as new pages are created without the website owner further modifying their page. These links may improve search crawl results and boost overall organic traffic to the site.

The number of links to created pages that are added to a page may be limited. For example, if there are one hundred created pages, it may not be desirable to include one hundred links on a particular web page. The links selected to be included on a particular page may periodically change. The links selected for a particular change may be different in different embodiments. For example, the links may be changed after a certain period of time has elapsed (e.g., cycling through the possible links). As another example, the links may be changed after a certain number of visits to the page has been reached.

As another example, the selection of links may be based on a determination of which pages it is desired to improve search rankings for, which may be determined by analyzing the current search rankings for the pages. For example, if it is desired to improve the search rankings for a particular page, link(s) to that page may be added to the website (e.g., included on the home page or other page(s) of the website). Thus in one embodiment, the optimization server 110 selects pages of the customer website that are not ranking as well as other pages of the customer website for improvement and adds link(s) to those pages to one or more pages of the customer website. Of course when adding a link, one or more links may also be replaced depending on the limit to the limit to the number of links to be added.

The optimization server 110 may select what page(s) of the customer website should include links to created pages, where the links may be different depending on the page. For example, the optimization server 110 may add different link(s) for the home page as compared to other page(s) of the customer website. A link on a home page will generally receive more traffic than a link on another page and have a better search ranking. Thus the optimization server 110 may select link(s) to add to the home page depending on which page(s) it wants to have a high search ranking and/or traffic. The optimization server 110 may also change the anchor text of link(s) to try to improve search ranking of a particular page. Flow moves from operation 535 to operation 540 where the page is published on the live website of the website owner.

Figure 11:
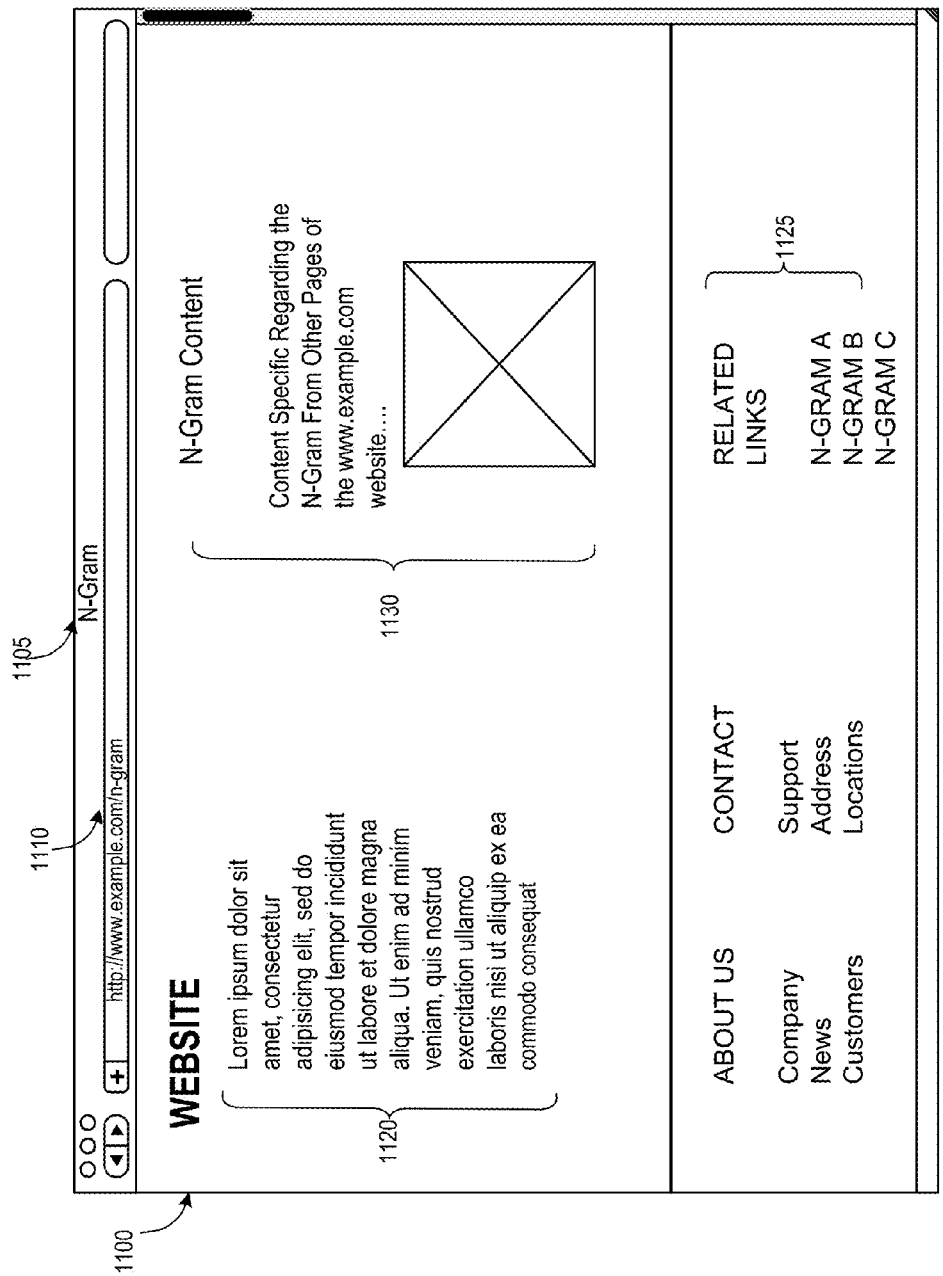
FIG. 11 illustrates an exemplary webpage that has been created according to some embodiments described herein.

FIG. 11 illustrates an exemplary webpage 1100 that has been created according to some embodiments described herein. The webpage 1100 includes a title 1105 that is based on the n-gram for which the page is directed. Also, the URL 1110 of the webpage 1100 also includes the n-gram for which the page is directed. The webpage 1100 includes content 1120 which may be part of the template of the website that may be common across all or most pages of the website. The webpage 1100 also includes the added content 1130 that the optimization server 110 located and retrieved from other pages of the customer website. The content 1130 is content that is specific regarding the n-gram from the website. The content 1130 may include text, media (e.g., an image, a video, and/or an audio clip), PDF documents, presentation documents, spreadsheet documents, word processing documents, etc.

The webpage 1100 also includes a set of related links 1125 that were dynamically added to the webpage. As illustrated in FIG. 11, the anchor text of each of these related links 1125 is based on a specific n-gram (e.g., n-gram A, n-gram B, and n-gram C). These links may point to pages that were created to fill content gaps regarding those n-grams (e.g., a page created for n-gram A, a page created for n-gram B, and a page created for n-gram C). It should be understood that in some embodiments the related links 1125 are included on other pages of the website that are not created by the optimization server 110 to fill a content gap.

Depending on the website that is being optimized, there may be many content gaps that could potentially be filled. However, some identified content gaps may be covered by other websites such that there is a small likelihood that even if a page that is dedicated to the content gap is created, the website will still not rank very high with respect to the created page. For example, if content corresponding to the content gap is covered by very large websites, it may not be likely that a created page to cover the content gap would rank very high with respect to the created page. In one embodiment, prior to creating the page or prior to the operator of the website reviewing the created page, the optimization server 110 predicts whether a created page for the content gap will rank within a top number (e.g., top 10) of results for one or more search engines.

Figure 6:
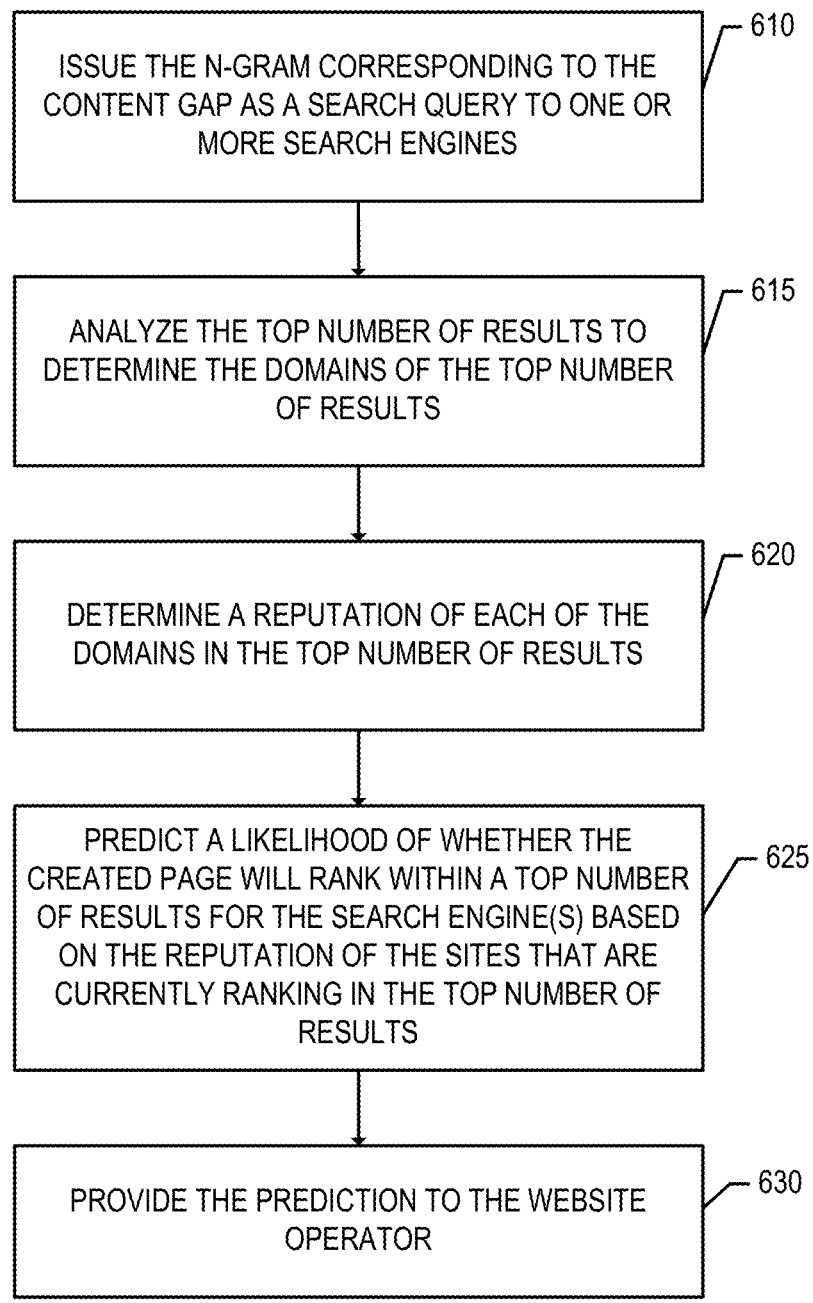
FIG. 6 is a flow diagram that illustrates exemplary operations performed by the optimization server for predicting whether a created page for a content gap will rank within a top number of results for one or more search engines according to one embodiment.

FIG. 6 is a flow diagram that illustrates exemplary operations performed by the optimization server 110 for predicting whether a created page for a content gap will rank within a top number of results for one or more engines according to one embodiment. At operation 610, the optimization server 110 issues the n-gram as a search query corresponding to the content gap to one or more search engines. Next at operation 615, the optimization server 110 determines analyzes the top number of results to determine the domains of the top number of results. Next, at operation 620, the optimization server 110 determines a reputation of each of the domains in the top number of results where the reputation is determined in part on the number of visitors to the domains. The optimization server 110 may utilize a web analytics service that tracks a number of visitors to the domains. Alternatively the optimization server 110 may use a popularity metric provided by one or more ISPs regarding those domains to determine the reputation of each of those domains.

Next, at operation 625, the optimization server 110 predicts the likelihood whether the created page will rank within a top number of results for the one or more search engines based at least on the reputation of the sites that are currently ranking in the top number of results. There is a stronger likelihood of the created page ranking within the top number of results if the currently ranking websites for the content gap have a relatively low reputation (as compared to the customer website). Likewise there is less likelihood of the created page ranking within the top number of results if the currently ranking websites for the content gap have a relatively high reputation (as compared to the customer website). The prediction may also consider the relevance of the n-gram corresponding to the content gap to the industry to which the customer website belongs, where a relatively high relevancy score for that n-gram increases the likelihood that the created page will rank within a top number of search engine results. The prediction may also consider the number of exact matches that appear in the titles of the search engine results to the query issued in operation 610, where the higher that number the lower the likelihood of the created page ranking within the top number of results.

Next, at operation 630, the optimization server 110 provides the prediction to the operator of the website to allow the operator to determine whether to proceed with creating the page.

Referring back to FIG. 3, after performing operation 345 to fill the content gap, flow then moves to operation 350 where the optimization server 110 determines whether there is another n-gram in the remaining set of n-grams. If there is, then flow moves back to operation 340; otherwise flow moves to operation 355 where the operations end.

As previously described, the customer website could be experiencing one or more reach gaps that can be automatically identified by the optimization server 110 and steps taken to help correct those reach gaps. The customer website may have one or more reach gaps for a particular topic if it is not ranking with a top results (e.g., within the top ten results) of one or more search engines. The customer website may have one or more reach gaps for a particular topic if that topic if the customer is not appearing on social media for that particular topic.

Figure 7:
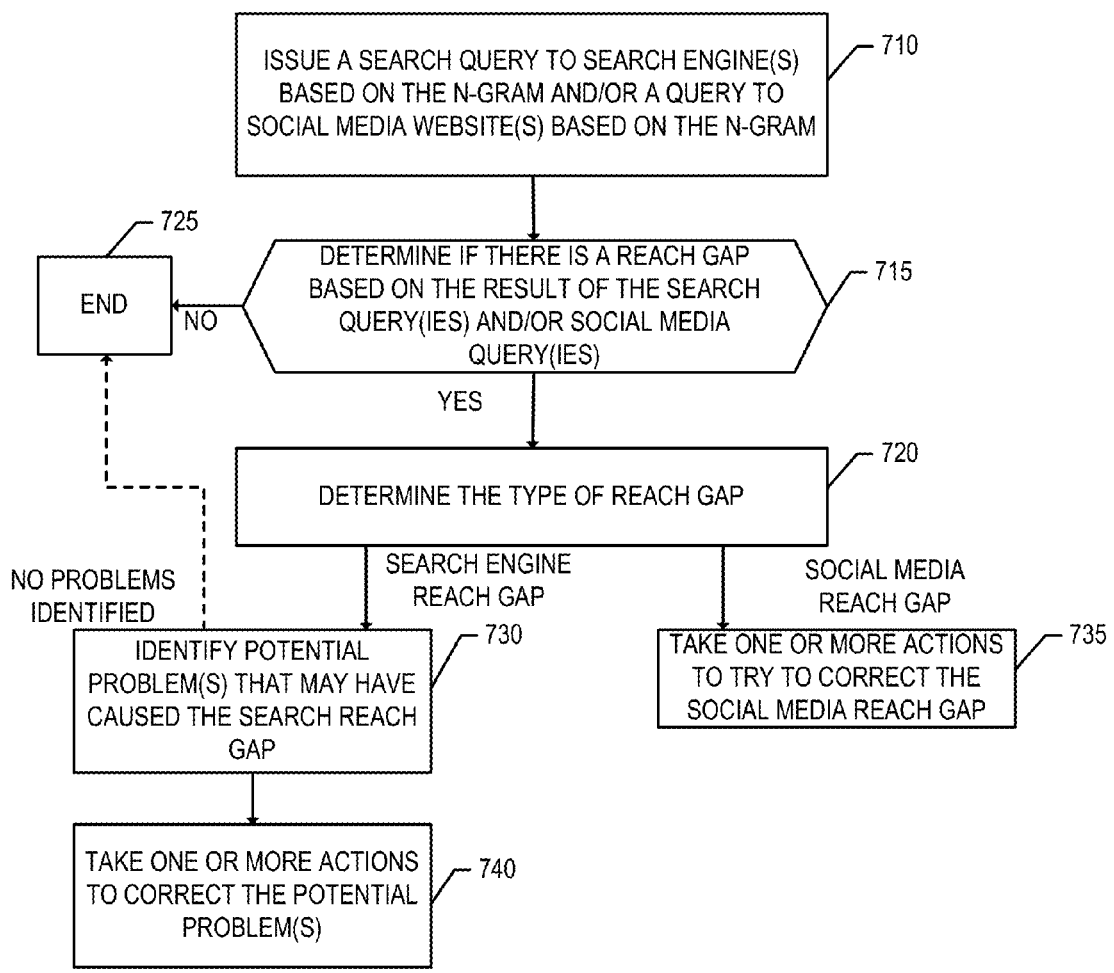
FIG. 7 is a flow diagram illustrating exemplary operations performed by the optimization server for identifying and help correcting a reach gap according to one embodiment.

FIG. 7 is a flow diagram illustrating exemplary operations performed by the optimization server 110 for identifying and help correcting a reach gap according to one embodiment. In one embodiment, the operations of FIG. 7 are performed after the operation 315, operation 325, or operation 330 described with respect to FIG. 3.

At operation 710, the optimization server 110 issues a search query to one or more search engines based on an n-gram and/or a query to one or more social media websites based on the n-gram. The n-gram is one of the n-grams generated in operation 315 that may be stemmed Prior to issuing the queries, the optimization server 110 may append and/or prepend a set of one or more other key words to the n-gram as previously described herein. Flow then moves to operation 715.

At operation 715, the optimization server 110 analyzes the results of issuing the search query and/or query to the social media website(s) of operation 710 to determine if there is a reach gap for any of the search engines and/or social media websites. For example, if the results of the search query do not include the customer website within a top results of the search engine(s) (e.g., the top ten results or other number of results), then there may be a potential reach gap for the corresponding n-gram for the customer website. If the query is not located on social media for the customer, then there may be a potential reach gap for the corresponding n-gram. If there is a reach gap, then flow moves to operation 720, otherwise flow moves to operation 725 where the operations end. The operations of FIG. 7 may be performed for each of the n-grams generated in operation 315 or reduced by operations 325 or 330.

At operation 720, the optimization server 110 determines the type of reach gap. If the type of potential reach gap is a search engine reach gap, then flow moves to operation 730. If the type of potential reach gap is a social media reach gap, then flow moves to operation 735.

At operation 730 (there is a potential search engine reach gap), the optimization server 110 analyzes the web pages that contain the n-gram on which the query was based to try to identify potential problems that may have caused the reach gap. For example, a cause of search engine reach gaps may occur when a page does not use an optimal title for their web page, URL format for their web page, and/or text used in an anchor text for their web page. For example, if the n-gram is "marketing automation solutions," the optimization server 110 analyzes pages that contain that n-gram and analyze their URL, title, and/or anchor text that lead to those pages. For example, to optimize the reach in search engine results, the URL of a page that is dedicated to the n-gram "marketing automation solutions" should include that n-gram. An example URL that includes that n-gram is <www.example.com/marketing-automation-solutions> where example.com is the domain of the customer website. Similarly, the text of the page that is dedicated to the n-gram should also include (or be exactly the same) as the n-gram. For example, if the n-gram is "marketing automation solutions," the title may be set as "Marketing Automation Solutions." Also, the text of the anchor text (if included) should also include (or be exactly the same) as the n-gram. If there is an identified problem, then flow moves to operation 740 where the optimization server 110 may take one or more actions to correct the potential problem. In one embodiment, the optimization server 110 automatically corrects the problem (e.g., change the title, change the URL, or change the anchor text). In another embodiment, the optimization server 110 notifies the customer of the potential problem and suggestions for improving the problem. If there is not an identified problem, then flow may move back to operation 725 where the operations end.

Even if potential problems are identified and corrected there may still be a reach gap for certain n-grams. For example, the content for that reach gap may be covered by other websites that have a high reputation such that even if the potential problems are corrected it may not be likely the page will rank within the top number of search results. Accordingly, in some embodiments, prior to determining if there is a potential search engine reach gap for a particular n-gram, the optimization server 110 predicts whether a page directed at that n-gram is likely to be within a top number of search results. For example and as similarly described with respect to FIG. 6, the top number of results may be analyzed by the optimization server 110 to determine the domains of the top number of results and the reputation of each of those domains may be determined. Using that information, the optimization server 110 predicts the likelihood whether any page of the customer for that n-gram will rank within a top number of results for the one or more search engines. There is a stronger likelihood of the created page ranking within the top number of results if the currently ranking websites for the n-gram have a relatively low reputation.

At operation 735 (there is a potential social media reach gap), the optimization server 110 may take one or more actions to try to correct the social media reach gap. For example, the optimization server 110 may provide recommendations to the customer on when a social media post and/or action regarding that n-gram should be taken and/or where the social media post and/or action regarding that n-gram should be directed. In one embodiment, to provide a recommendation on when a social media post should be placed, the optimization server 110 analyzes the time of social media posts and correlates those posts with a number of re-posts. A re-post of a social media post has a larger reach than a social media post that is not re-posted. A time with a higher correlation of re-posts will have more reach than a time with a lower correlation of re-post. The optimization server 110 provides the time that typically has the highest amount of re-posts.

As previously described, the customer website could be experiencing one or more engagement gaps. An engagement gap occurs when visitors to page(s) of the customer website do not stay very long on those page(s). In one embodiment, each page of the customer website is modified to include a lightweight client-side script or other mechanism to track how long a visitor stays at a particular page of a website and report that information to the optimization server 110. In addition, each page of the customer website is modified to include a client-side script that reports certain statistical information to the optimization server 110. This statistical information may include the key words that the visitor used to reach the web page (these key words may only be available for paid search results in some cases) among other items.

Figure 8:
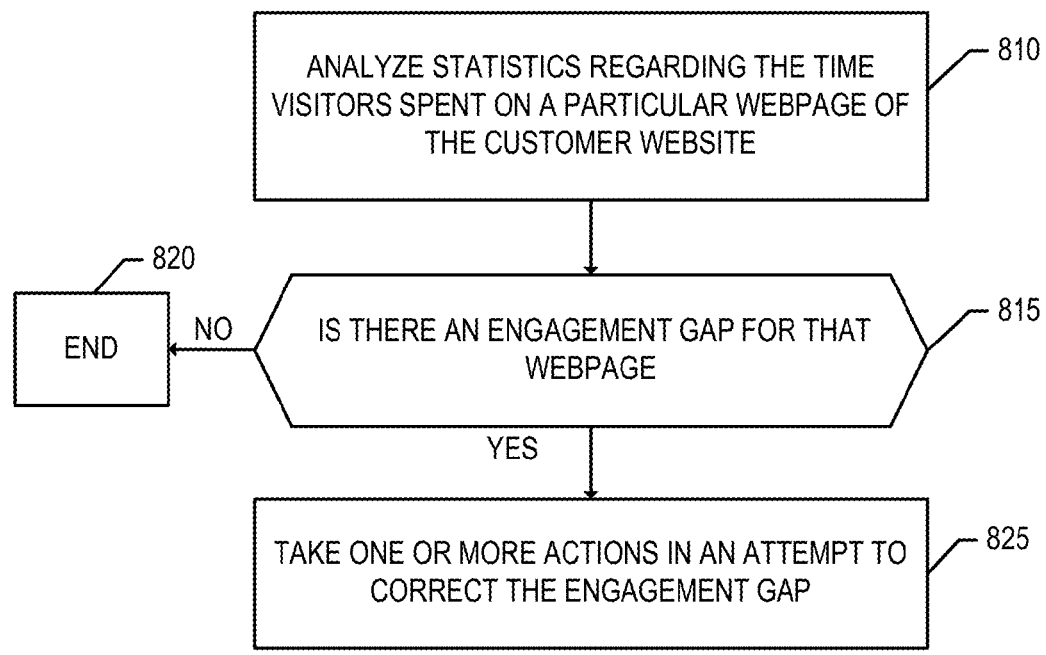
FIG. 8 is a flow diagram that illustrates exemplary operations performed by the optimization server for identifying an engagement gap and taking steps to correct the engagement gap according to one embodiment.

FIG. 8 is a flow diagram that illustrates exemplary operations performed by the optimization server 110 for identifying an engagement gap and taking steps to correct the engagement gap according to one embodiment. At operation 810, the optimization server 110 analyzes statistics regarding the time visitors spent on a particular webpage of the customer website. Certain types of visitors will typically spend a longer time on the website than other visitors. For example visitors that are already aware of the customer will generally spend longer when visiting the website than visitors that are not aware of the customer. As used herein, a branded visitor is a visitor that is likely aware of the customer prior to the visit and a non-branded visitor is a visitor that may not be aware of the customer prior to the visit. Flow moves from operation 810 to operation 815.

Figure 9:
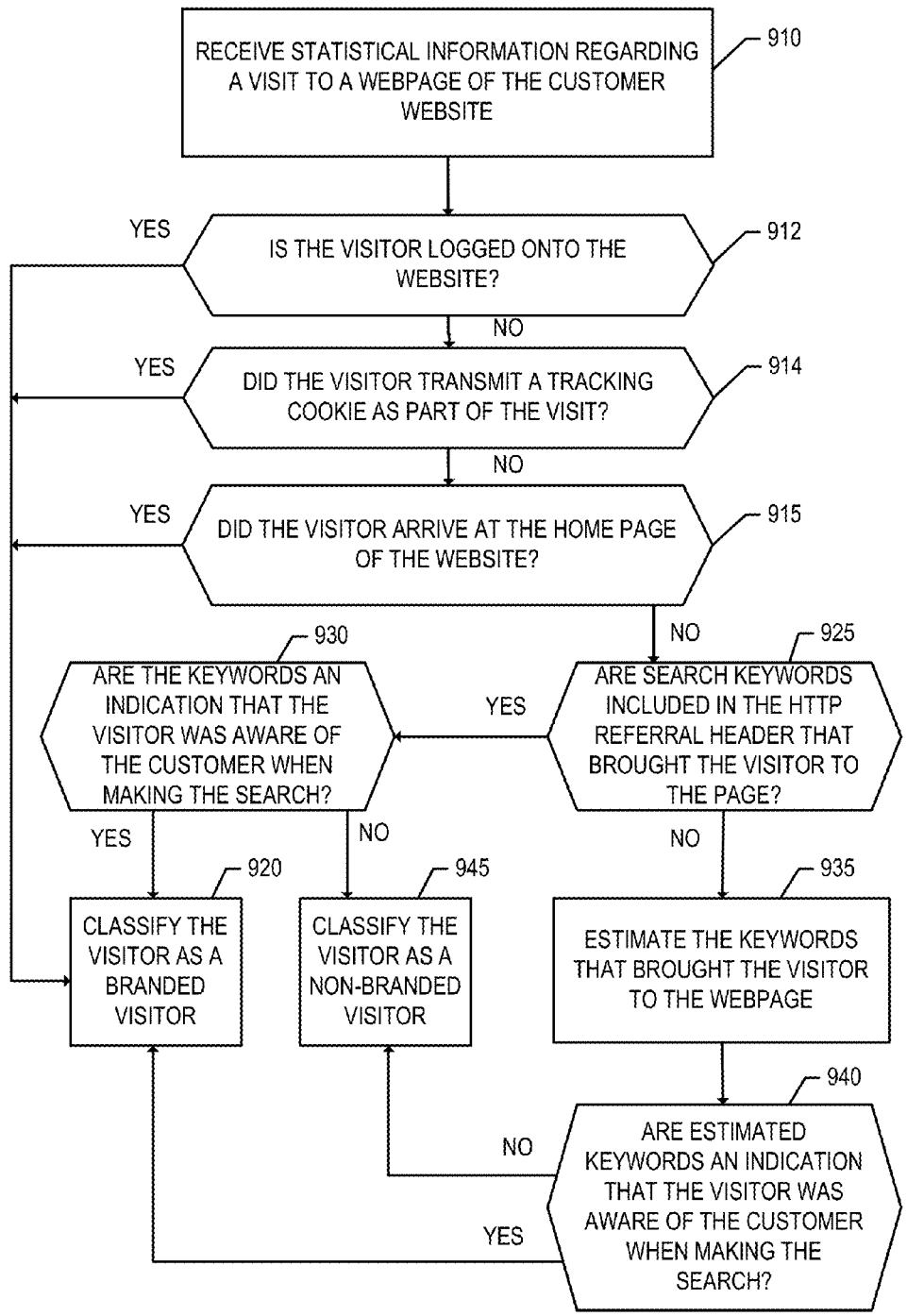
FIG. 9 is a flow diagram that illustrates exemplary operations performed by the optimization server for classifying visitor traffic to the customer website to estimate whether a visitor is aware of the customer website according to one embodiment.

FIG. 9 is a flow diagram that illustrates exemplary operations performed by the optimization server 110 for classifying visitor traffic to the customer website to estimate whether a visitor is aware of the customer website. At operation 910, the optimization server 110 receives statistical information regarding a visit to a webpage of the customer website. This statistical information may be received as a result of a client-side script executing on the visitor's browser. The statistical information may include several different pieces of information. For example, the statistical information may indicate the page being visited (e.g., a URL of the page being visited), an HTTP referral header which is used to identify the address of the webpage that linked to the page being requested (it indicates where the request originated), and may also include a time spent on the page. The statistical information may also include whether a cookie for the website was sent by the visitor as part of the visit (a cookie included in the request for the page indicates that the visitor had previously visited that page). The statistical information may also include an indication whether the user is logged onto the customer website.

Flow then moves to operation 912 where the optimization server 110 determines whether the visitor is logged onto the website, which may be determined through the use of an authentication cookie. A visitor that is logged onto the website is likely to be aware of the customer website (e.g., the visitor has registered for an account for the customer website). If the visitor is logged onto the website, then flow moves to operation 920 where the session of the visitor is classified as belonging to a branded visitor. If the visitor is not logged onto the website, then flow moves to operation 914.

At operation 914, the optimization server 110 determines whether the visitor transmitted a tracking cookie as part of the visit. A tracking cookie included in the request for the page indicates that the visitor had previously visited that page and thus is likely to be aware of the customer website. The tracking cookie(s) may be set by the customer website and/or the optimization service. If a tracking cookie was included in the request, then flow moves to operation 920 where the session of the visitor is classified as belonging to a branded visitor. If a cookie was not included in the request, then flow moves to operation 915. In some embodiments, the tracking cookie may include a visit count that tracks the total amount of visits from the visitor over a particular time period. In such embodiments, the optimization server 110 may move to operation 920 only if the number of visits exceeds a predefined threshold (which may be configurable by the customer); otherwise flow will move to operation 915. In yet other embodiments, the tracking cookie may include a last visited date/time where the optimization sever 110 will not move to operation 920 from operation 914 if the last visited date/time was not within a predefined amount of time (e.g., not within the last week); instead it will move to operation 915.

At operation 915 the optimization server 110 determines whether the visitor arrived at the homepage of the customer website (e.g., using the statistical information received in operation 910). A visitor that arrives at the homepage of the customer website is likely to be aware of the customer website. If the visitor arrived at the homepage of the customer website, then flow moves to operation 920 where the session of the visitor is classified as belonging to a branded visitor. If the visitor did not arrive at the homepage of the customer website, then flow moves to operation 925.

At operation 925, the optimization server 110 determines if a search keyword is included in the HTTP referral header that brought the visitor to the webpage. The search keyword may include one or more search terms (words). In some cases the HTTP referral header does not provide the search keyword that brought the visitor to a particular webpage. In such cases, the optimization server 110 may estimate what keyword brought the visitor to the page. This keyword is sometimes referred herein as a "proxy keyword." If the keyword is included in the HTTP referral header, then flow moves to operation 930. If the keyword is not included in the HTTP referral header, then flow moves to operation 935.

At operation 930, the optimization server 110 determines whether the keyword included in the HTTP referral header serves as an indication that the visitor was aware of the customer when making the search. For example, visitors that landed on the webpage as a result of issuing a search query that includes search terms that are specific to the customer already (e.g., the name of the customer, a trade product name offered by the customer, etc.) are likely aware of the customer (because they are specifically searching for words specific to that customer) and thus will likely spend a longer time visiting the website than other visitors. These keywords that are specific to the customer are referred herein as "branded keywords." In one embodiment the optimization server 110 determines which keywords are branded keywords automatically for the customer and/or with input from the customer. For example, the optimization server 110 can analyze the customer website to determine the a likelihood of the name of the products they are selling and/or services they are provided, look for trademark symbols or registered trademark symbols. The customer may also provide a list of keywords or brand names to the optimization server 110. The optimization server 110 may also expand the list of branded keywords to include variants of those keywords. For example, if the name of the customer is ExampleCustomer (no space between the word example and the word customer), a variant of that customer name may be "Example Customer" that includes a space between the word example and the word customer. If analysis of the keyword included in the HTTP referral header indicates that the visitor was aware of the customer when performing the search, then flow moves to operation 920 where the session of the visitor is classified as belonging to a branded visitor. If analysis of the keyword included in the HTTP referral header does not indicate that the visitor was aware of the customer when performing the search, then flow moves to operation 945 where the session of the visitor is classified as belonging to a non-branded visitor In some cases the HTTP referral header does not provide the keyword that brought the visitor to a particular webpage. At operation 935 (the keyword is not included in the HTTP referral header), the optimization server 110 estimates the keyword that brought the visitor to the page (the proxy keyword). In one embodiment, to determine the proxy keyword, the optimization server 110 issues many different combinations of keywords as queries against one or more search engines and examines the results. If there is a one-to-one correspondence between a query and a page, then it is likely that when traffic goes to the page the keyword that were used in that query were probably issued to go to that page. In another embodiment, the optimization server 110 determines the proxy keyword by examining parts of the page that search engines more heavily weigh in their search algorithms (e.g., the title, URL) and determine what n-gram(s) are included in those parts. By way of example, if the title of the webpage is "Marketing Automation Solutions," and there is an n-gram of "marketing automation solutions," then it is likely that the keyword that brought the visitor to the webpage include "marketing," "automation," and "solutions" (or a similar variant of terms). Flow then moves to operation 940.

At operation 940, the optimization server 110 determines whether the estimated keyword (the proxy keyword) indicate whether the visitor was aware of the customer when visiting. For example, the optimization server 110 compares the estimated keyword with the set of branded keywords to determine whether the estimated keyword includes a branded keyword. If analysis of the estimated keyword indicates that the visitor was aware of the customer when visiting, then flow moves back to operation 920 where the session of the visitor is classified as belonging to a branded visitor. If analysis of the estimated keyword does not indicate that the visitor was aware of the customer when visiting, then flow moves to operation 945 where the session of the visitor is classified as belonging to a non-branded visitor.

Referring back to FIG. 8, at operation 815 the optimization server 110 determines whether there is an engagement gap for that webpage by a comparison between the time spent on that webpage for the group of branded visitors with the time spent on that webpage for the group of non-branded visitors. The average time spent on that webpage for the group of branded visitors will generally be larger than the average time spent on that webpage for the group of non-branded visitors. By way of example, the optimization server 110 determines that there is an engagement gap for that webpage if the average time spent for the group of non-branded visitors is below a threshold percentage of the average time spent for the group of branded visitors. If there is not an engagement gap, then flow moves to operation 820 where the operations end. It should be understood that the operations of FIG. 8 can be performed for each webpage of the customer website. If it is determined that there is an engagement gap for the webpage, then flow moves to operation 825.

At operation 825, the optimization server 110 takes one or more actions in an attempt to correct the engagement gap. One example action is creating a widget on the page that promotes interaction between the visitor and the site. As another example different graphics may be chosen. As another example, the optimization server 110 may suggest one or more actions for the administrator of the customer website (e.g., the suggestions may include to review the content, add multimedia content, etc.). For example, the widget may be a multi-sequence form, as will be described in greater detail later herein. In one embodiment, the widget is customized based on the keyword(s) that the visitor used to get to the site and may be dynamically changed based on these keyword(s). For example, the title of the widget and/or the content of the widget may match the incoming keyword(s). This makes it more likely that the visitor will be engaged with the widget and thereby increasing engagement. As another example action, the optimization server 110 may notify the customer of the engagement gap on that page.

The customer website could be experiencing one or more conversion gaps. A conversion gap may exist when a page of the website has a form that is not being filled out by very many visitors. In one embodiment, to correct a conversion gap the optimization server 110 creates a conversion experience, which is a sequence of web pages that each consist of content and questions. The content may be chosen by the optimization server 110 based on one or more of the following: the interest in that content shown by visitors with a similar profile, the relevance of the content to the intent of the website visitor which is inferred from the search term(s) (the search keyword) used by the visitor to arrive at the page if arriving through a search engine (e.g., whether the keyword is a branded keyword), and the visitor's answers to the questions asked in previous web pages in this sequence of web pages. The profile of a visitor includes one or more of: the referring website (available in the HTTP referral header and indicates the website the visitor came from or visited just prior to landing on the customer website), the search term or search phrase (the search keyword) used by the visitor to come to the page (if the visitor came to the page through a search engine), and any other details that are either known or can be inferred about the visitor such as geographical area, company, industry vertical, profession, and previous activity on this or other websites. The relevance of the content to the intent of the website visitor which is inferred from the search term(s) used by the visitor to arrive at the page if arriving through a search engine may be determined by a measurement based on the frequency of occurrence of the search term(s) or synonymous of the search term(s). Also, different pieces of content may be ranked based on relevance and the most relevant content is chosen to be shown to the visitor. The questions may be chosen based on human input, the fraction of other visitors with similar profiles that answered the question versus those that chose not to answer the question. In one embodiment the conversion experience is a multi-sequence form to replace the original form that is not being filled out by very many visitors.

Figure 10:
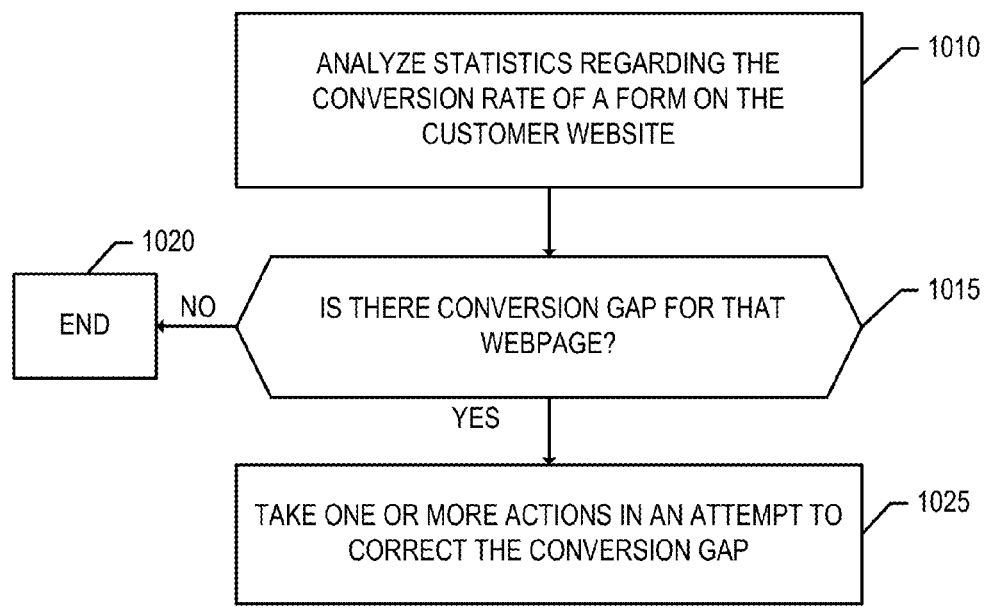
FIG. 10 is a flow diagram that illustrates exemplary operations performed by the optimization server for identifying a conversion gap and taking steps to correct the conversion gap according to one embodiment

Determining whether there is a conversion gap is similar to determining whether there is an engagement gap according to some embodiments. FIG. 10 is a flow diagram that illustrates exemplary operations performed by the optimization server 110 for identifying a conversion gap and taking steps to correct the conversion gap according to one embodiment. At operation 1010, the optimization server 110 analyzes statistics regarding the conversion rate of a form on the customer website. Certain types of visitors will typically convert at a higher rate than other visitors. For example, visitors that are already aware of the customer when visiting will generally convert at a higher rate than visitors that are not aware of the customer.

Flow moves from operation 1010 to operation 1015 where the optimization server 110 determines whether there is a conversion gap for that webpage by a comparison between the conversion rate of the form assigned to the group of branded visitors with the conversion rate of the form assigned to the group of non-branded visitors. The optimization server 110 may determine the group of branded visitors and non-branded visitors as described with respect to FIG. 9. The conversion rate of branded visitors will typically be larger than the conversion rate of non-branded visitors. By way of example, the optimization server 110 determines that there is a conversion gap if the conversion rate for the group of non-branded visitors is below a threshold percentage of the conversion rate for the group of branded visitors. If there is not a conversion gap, then flow moves to operation 1020 where the operations end. It should be understood that the operations of FIG. 10 can be performed for each form of the customer website. If it is determined that there is a conversion gap, then flow moves to operation 1025.

At operation 1025, the optimization server 110 takes one or more actions in an attempt to correct the conversion gap. In one embodiment, to correct a conversion gap the optimization server 110 creates a conversion experience, which is a sequence of web pages that each consist of content and questions.

In one embodiment, a multi-sequence form is created and replaces the original form. Embodiments divide a plurality of input areas within the original form and distribute them among multiple stages of the multi-sequence form. Additionally, a stage including an input area determined to be of the input type categorized as having a higher likelihood of being completed and submitted by the user is ordered first in the multi-sequence form. A user visiting the updated webpage is initially presented with the first stage of the multi-sequence form, which includes a fraction of the total input areas and those input areas included in the first stage are of a type that have a higher likelihood of user submission. As a result, the multi-sequence form appears to request a more manageable amount of data and the user is more likely to complete and submit more input areas than a user would have done with the original form.

Figure 12:
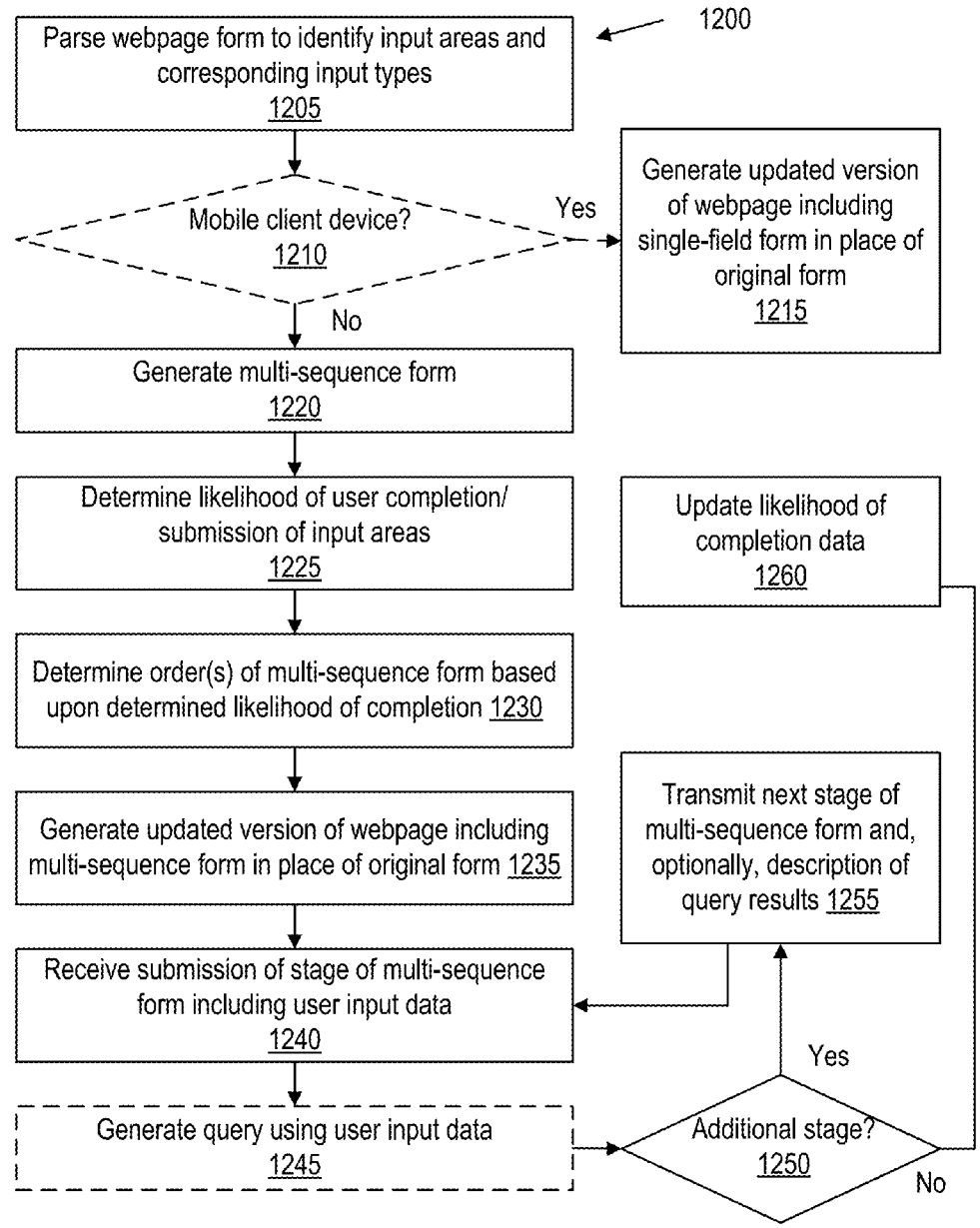
FIG. 12 is a flow chart illustrating an exemplary method of webpage form optimization.

FIG. 12 is a flow chart illustrating exemplary method 1200 of webpage form optimization. At block 1205, optimization server 110 parses a form from a webpage to identify a plurality of input areas and corresponding input types. For example, as described above, optimization server 110 may request the webpage from webpage server 115 or optimization server 110 may be implemented by web server 115. Alternatively, a copy of the webpage may be transferred to optimization server 110 in another manner, e.g., via portable storage medium, delivered by web server 115 without a request from optimization server 110, transmitted by client device 105, etc.

In one embodiment, optimization server 110 parses the webpage to determine that the webpage includes a form and/or to otherwise locate the form within the webpage. For example, the webpage may include tags within the markup language used to implement the webpage. Optimization server 110 parses the webpage for tags used to designate the beginning and end of a form. In one embodiment, the form is also implemented in a markup language and optimization server 110 parses the form to identify tags, e.g., for graphical user interface elements such as input boxes, drop down lists, radio buttons, check boxes, submit buttons, etc. Alternatively, an interpreted or compiled language implements the form and the markup language references a script. In such an embodiment, optimization server 110 parses the script to find indicators of the above-referenced graphical user interface elements.

Additionally, within the implementation of each graphical user interface element, optimization server 110 parses metadata or other parameters to identify an input type for each the corresponding graphical user interface element. For example, a form implemented in a markup language may include a type or other parameter describing an input interface. Alternatively, optimization server 110 parses other data or metadata, such as text boxes or other labels implemented in proximity to input elements. These text boxes or other labels are used to provide a user with an indication of the expected input, comments, etc., to identify an input type for the corresponding graphical user interface element. An exemplary webpage including a form to be parsed is described herein with reference to FIG. 13.

At block 1210, optimization server 110 optionally determines if a client device 105 requesting the webpage is a mobile device or if a mobile-specific form is to be generated. For example, a software agent within client device 105 identifies itself, its application type, operating system, software vendor, and/or software revision, by submitting a characteristic identification string to optimization server 110. Optimization server 110 determines, e.g., using a data structure that maps identification string elements to mobile and desktop platforms, the identification information to a mobile or desktop platform.

In an alternate embodiment, optimization server 110 generates the updated mobile version of the webpage in anticipation of receiving a request from a mobile device and optimization server 110 transmits the updated mobile version of the webpage or the single-field form portion thereof to the client device 105 in response to determining that the client device 105 is a mobile device. For example, optimization server 110 parses the webpage as described above and determines if a separate mobile device call to action is to be supported. Optimization server 110 generates the single-field form in response to determining that the webpage is to support mobile devices or otherwise provide a mobile-specific form. As a result, when a request for the webpage from a mobile device is received (e.g., the mobile device being identified as described above), optimization server 110 responds to the request with the updated mobile version of the webpage.

At block 1215, in response to determining that the client device 105 is a mobile device or otherwise that a mobile-specific form is to be generated, optimization server 110 generates an updated version of the webpage for a mobile device. Generating the updated mobile version of the webpage includes removing the webpage form and replacing it with a single-field form. For example, a website may include a defined call to action for a user to access particular content, such as a video, white paper, etc. The call to action may be a request for the user to fill out the webpage form described above, e.g., the webpage including the form would be presented in response to the user selecting a link to download the content. In this embodiment, however, the call to action automatically changes based upon the type of client device 105. While a user of a desktop client device 105 is presented with a form having a plurality of input areas, a user of a mobile device 105 is presented with a form having a single input area. In one embodiment, the single input area is a request for an email address. An exemplary mobile webpage including a single-field form is described herein with reference to FIG. 14.

At block 1220, if optional block 1210 is omitted or if client device 105 is determined not to be a mobile device, optimization server 110 generates a multi-sequence form. As used herein, a multi-sequence form refers to a form including a plurality of stages. Each stage of the multi-sequence form is to be displayed and submitted independently of other stages of the multi-sequence form. In one embodiment, each stage is displayed as a part of subsequent versions of the webpage. For example, optimization server 110 transmits a version of the updated webpage including one stage in response to receiving the submission of a previous stage. In another embodiment, optimization server 110 transmits one stage as a part of an update of a frame or other portion of the webpage in response to receiving the submission of a previous stage. For example, the stage update within the portion of the webpage is independent of other content within the webpage and other content within the webpage may remain consistent from one stage of the multi-sequence form to another stage of the multi-sequence form.

Additionally, each stage of the multi-sequence form corresponds to a subset of the parsed form including one or more of the identified input areas. In one embodiment, optimization server 110 determines how many input areas are included in the original form and distributes one or more input areas to each stage based upon the total number of input areas. In one embodiment, optimization server 110 utilizes a defined set of rules and/or priorities to select input area subsets according to the identified input area types. In one embodiment, input areas of the same or similar type, e.g., input areas requesting a user's first name and last name, respectively, are selected for inclusion in a single subset, which corresponds to a single stage. Additionally, dissimilar input area types may be mapped to a single subset based upon the defined rules and/or priorities, an individual input area type may be mapped to be the only input area in a given subset, etc. As a result, the multi-sequence form includes multiple stages, each of which includes one or multiple of the input areas of the original form. An exemplary updated webpage including a multi-sequence form is described herein with reference to FIGS. 15 and 16.

At block 1225, optimization server 110 determines the likelihood of user completion or submission of input areas. In one embodiment, optimization server 110 determines the likelihood of user completion or submission based upon the input type of each input area. For example, optimization server 110 may reference a data structure mapping each input type to a likelihood of user completion or submission.

In one embodiment, the mapping is based upon a level of anonymity associated with the data requested for a given input area. For example, a user's interest in the content of the webpage provides greater anonymity than the user's residential or work zip code, the user's residential or work zip code provides greater anonymity the user's name, and the user's name provides greater anonymity than the user's email address or phone number. Such an embodiment operates under the assumption that a user is more likely to complete and submit an input area requesting data having a higher level of anonymity than an input area requesting data having a lower level of anonymity or otherwise requesting more personal information. Additionally, or alternatively, the mapping is based upon a history of users completing and submitting individual input areas or input areas of a given type. For example, optimization server 110 may track user completion and submission of input fields (based upon input area or type) for an individual webpage, a domain, or for multiple webpages or domains. Additionally, optimization server 110 may track a total number of unique users to visit the corresponding webpage/stage of a multi-sequence form over the same period of time. Optimization server 110 determines the likelihood of user completion or submission as a percentage, e.g., actual user completion and submission of an input field divided by the total number of unique users to visit the corresponding webpage/stage of the multi-sequence form.

In one embodiment, optimization server 110 further refines the likelihood of user completion or submission using contextual information. For example, the tracked history described above may be divided according to how the user reached the webpage (e.g., from a search engine, based upon search terms used to find the website, from a link from another website, as a result of the user directly entering the webpage address into a browser, etc.), an order in which input areas/types are presented to the user (e.g., based upon A/B testing of orders of different stages of a multi-sequence form), a determined geographical location of the user (e.g., based upon network address information), data submitted in an input area of a previous stage of a multi-sequence form, etc. Users arriving at the webpage using a first set of one or more search terms may have a different likelihood of user completion or submission of an input area than users arriving at the webpage using a different set of one or more search terms and a different likelihood of user completion or submission of an input area than users arriving at the webpage as a result of a link from another website. Similarly, users arriving at the webpage as a result of a link from a particular website or type of website may have a different likelihood of user completion or submission of an input area than users arriving at the webpage as a result of a link from a different website or type of website.

In one embodiment, optimization server 110 determines the likelihood of user completion or submission of input areas prior to generating the multi-sequence form (as described with reference to block 1220). For example, the selection of input area subsets may include grouping input areas based upon the determined likelihood of user completion or submission. Alternatively optimization server 110 determines the likelihood of user completion or submission of input areas in parallel with or subsequent to the generation of the multi-sequence form.

At block 1230, optimization server 110 determines an order of the multi-sequence form based upon determined likelihood of completion. In one embodiment, optimization server 110 selects a stage including the identified input area determined to be of the input type categorized as having a higher likelihood of being completed and submitted to be first in an order of stages in the multi-sequence form. For example, the stage with the highest likelihood of completion and submission (based upon one or more input areas/input area types within that stage) is presented to a user first to increase the likelihood the user will complete and submit input areas of other stages or otherwise increase user engagement with the webpage. Additionally, two or more stages may be ordered from highest likelihood through lowest likelihood.

In one embodiment, optimization server 110 determines multiple orders of the multi-sequence form based upon determined likelihood of completion and submission. For example, optimization server 110 selects two different stages to serve as alternate first stages of the multi-sequence form and presents them to different groups of user as a part of A/B testing to refine the stored likelihood of completion and submission of individual input areas or of the entire form.

At block 1235, optimization server 110 generates an updated version of the webpage including the multi-sequence form in place of the original form. For example, the original form may have been defined as occupying a defined/relative position within the webpage. In generating the updated version of the webpage, optimization server 110 deletes the webpage element(s) that define, link, or otherwise include the original form and replace them with webpage element(s) that define, link, or otherwise include the multi-sequence form. In one embodiment, optimization server 110 generates multiple versions of the updated webpage. For example, optimization server 110 may generate separate webpages for each stage of the multi-sequence form. Alternatively, as described above, the multi-sequence form is included via a script, link, etc. and implemented within a frame or other independent portion of the updated webpage.

One or more stages of the multi-sequence form typically occupy less space than the original form. As a result, when optimization server 110 generates an updated version of the webpage including the multi-sequence form in place of the original form, the layout of the webpage may have lost aesthetic appeal due to unoccupied space that lies in the area between the boundary of the original form and the boundary of the multi-sequence form. In one embodiment, optimization server 110 generates a message or notification to an administrator to review the updated version of the webpage and, if needed, modify the layout of other elements within the webpage to fill the space once filled by the original form that is not filled by the multi-sequence form. Once reviewed and potentially modified by the administrator, optimization server 110 receives a message or notification from the administrator confirming that the updated webpage is ready for publication. In another embodiment, optimization server 110 automatically adjusts the webpage layout in response to replacing the original form with the multi-sequence form. In such an embodiment, the updated webpage may still be subjected to administrator review as described above.

At block 1240, optimization server 110 receives a submission of a stage of the multi-sequence form. For example, the updated version of the webpage including a first stage of the multi-sequence form is transmitted to a client device 105 in response to a request. A user of client device 105 completes one or more input areas of the first stage of the multi-sequence form. Client device 105 submits the data input from the user to optimization server 110, e.g., in response to the user selecting a submit button or automatically in response to detecting data input within one or more input areas.

At block 1245, optimization server 110 optionally generates a query using the user input data received as a result of the completion and submission of the current stage of the multi-sequence form. For example, a website may provide a list of potential customers or service providers in response to the completion and submission of the original form. In response to a submission of a single stage of the multi-sequence form, however, the user may not have provided a sufficient amount of data to generate a full/tailored list of results or to justify sharing the full/tailored list of results. Accordingly, based upon completion and submission of user data from a single stage, optimization server 110 initiates an initial query to determine a number of results (or other metadata describing the results) of the query based upon the initial user-submitted data. If the user provided some data indicating a geographic location, such as a zip code, optimization server 110 generates a query of potential customers/service providers within that zip code to provide the user with an indication of how much data may be available if the user completes and submits the data of a subsequent stage of the multi-sequence form. As a result, the completion and submission of one stage generates data to incentivize the user to complete and submit additional stages of the multi-sequence form.

At block 1250, optimization server 110 determines if there is another stage of the multi-sequence form to be presented to the user. If so, at block 1255, optimization server 110 transmits the next stage to client device 105 (e.g., in response to the completion and submission of the current stage). As discussed herein, the second stage may be updated within a frame or other portion the webpage previously transmitted to client device 105 or optimization server 110 may transmit another version of the updated webpage including the second stage. If optimization server 110 generated a query at block 1245, optimization server 110 transmits the metadata or other description of the query results along with the next stage. Method 120 continues at block 1240.

If optimization server 110 determines there is not another stage of the multi-sequence form to be presented to the user, at block 1260, optimization server 110 updates the likelihood of completion and submission data (e.g., as described above). Additionally, optimization server 110 may further transmit the query results or other content to client device 105 in response to the completion of all stages of the multi-sequence form. For example, the viewing or downloading of a white paper, video, or other content by a user may be contingent up the completion and submission of all stages of the form. Upon receiving submission of the final stage of the multi-sequence form, optimization server 110 transmits the white paper, video, or other content to client device 105.

As described herein, web server 115 and optimization server 110 may be implemented as separate devices or within a single device. Additionally, elements of method 1200 may be performed by web server 115, optimization server 110, or collectively by both web server 115 and optimization server 110. Reference to specific elements of method 1200 being performed by optimization server 110, therefore, are not intended to be limited to only being performed by optimization server 110.

Figure 13:
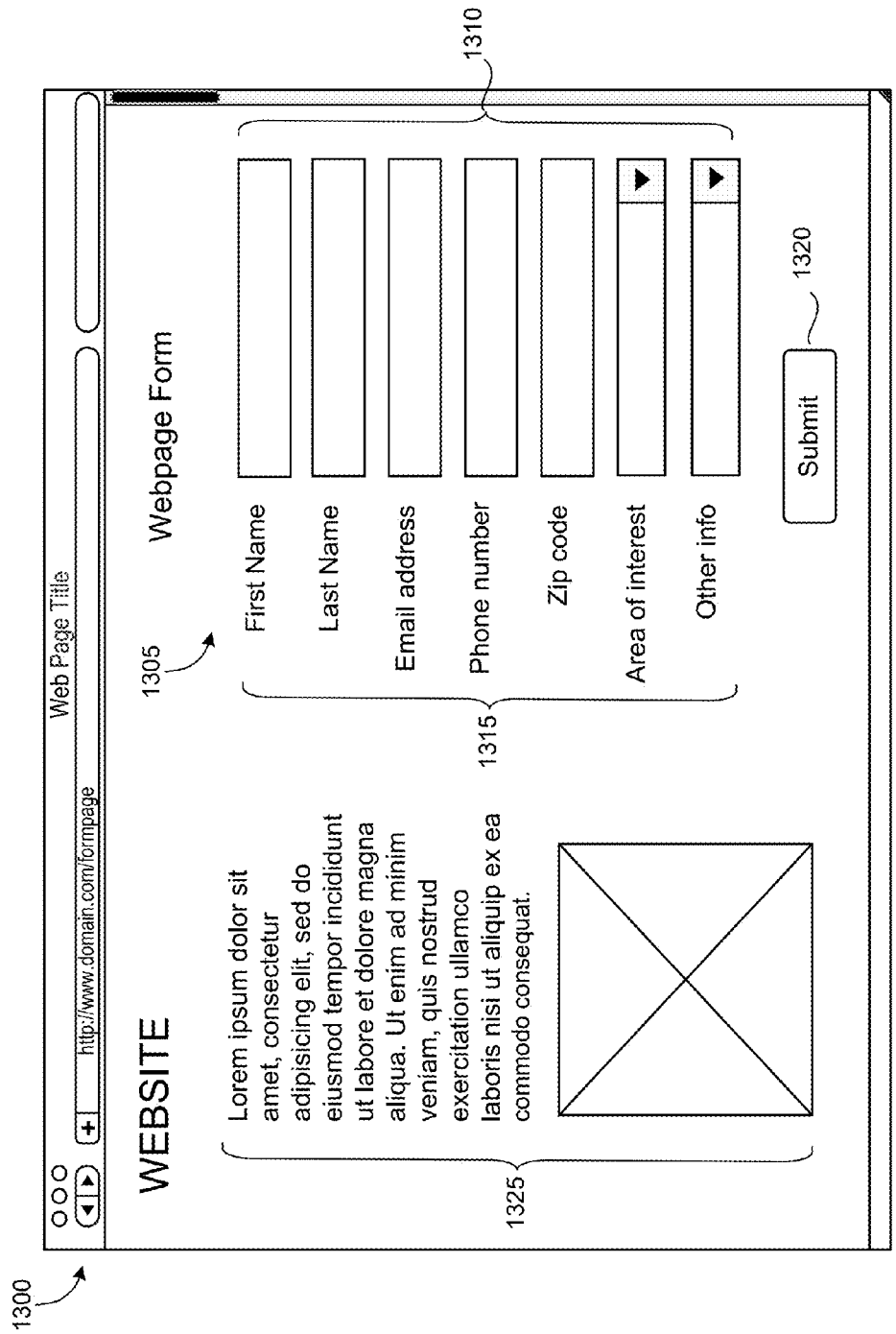
FIG. 13 illustrates an exemplary webpage including a form.

FIG. 13 illustrates exemplary webpage 1300 including a form 1305. As described herein, form 1305 includes multiple input areas 1310. Each input area 1310 further includes a descriptive or instructive label 1315 to provide the user with an indication as to the expected input data in each input area 1310. As described herein, optimization server 110 may parse descriptive or instructive labels 1315 to determine input area types for corresponding input areas 1310. Webpage 1300 further includes submit button 1320 to enable user submission of completed input areas 1310. Additionally, webpage 1300 includes content 1325, which may include text and/or one or more images.

Figure 14:
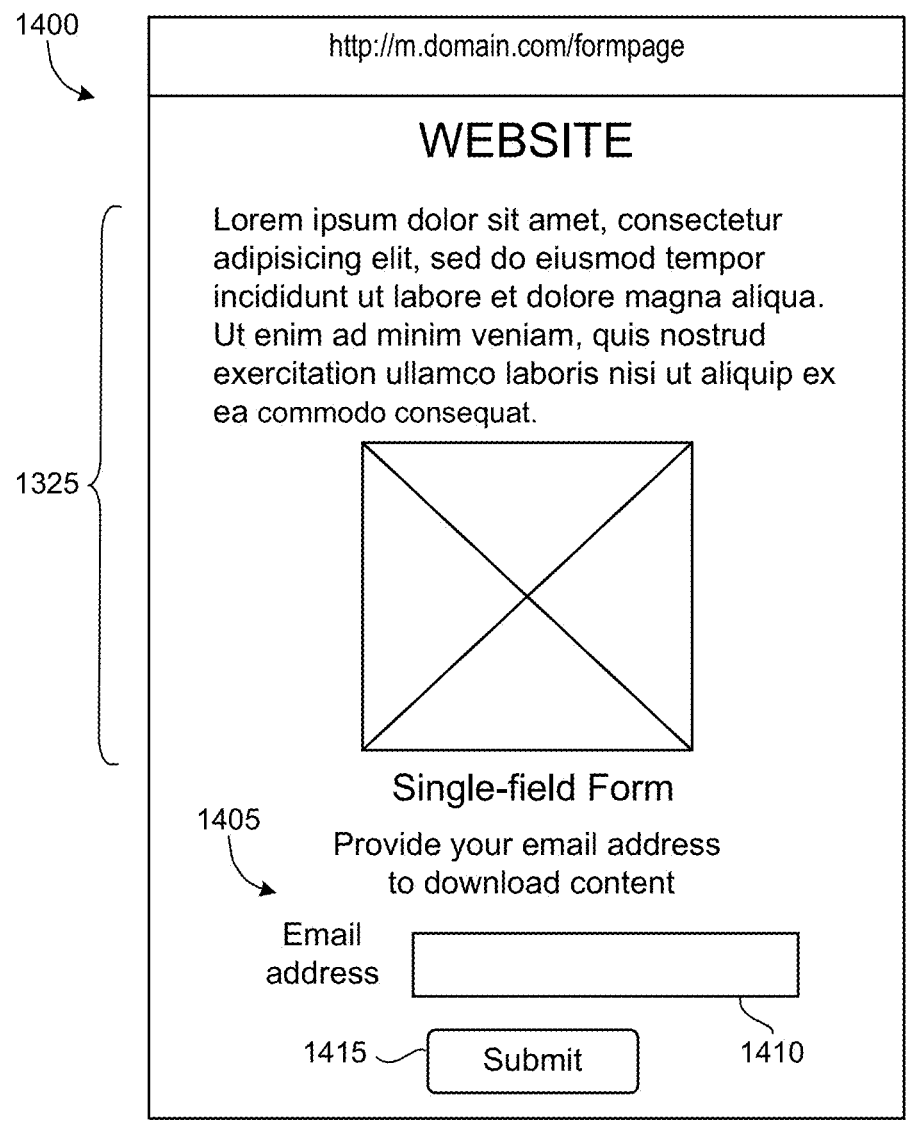
FIG. 14 illustrates a mobile webpage including a single-field version of the form.

FIG. 14 illustrates exemplary mobile webpage 1400 including single-field version of the form 1405. As described herein, optimization server 110 may generate and/or transmit mobile webpage 1400 to support mobile devices or in response to detecting that the requesting client device 105 is a mobile device. Similar to original webpage 1300, updated mobile version 1400 includes content 1325. In place of original form 1305, however, mobile webpage 1400 includes single-field form 1405. Single-field form 1405 includes one input area 1410. For example, single-field form 1405 may serve to request the most pertinent or valuable data input from a user. If the form seeks to generate a sales lead, the most pertinent or valuable data input would be a type of contact information, such as an email address. Submit button 1415 enables the mobile user to submit data inputted within input area 1410.

Figure 15:
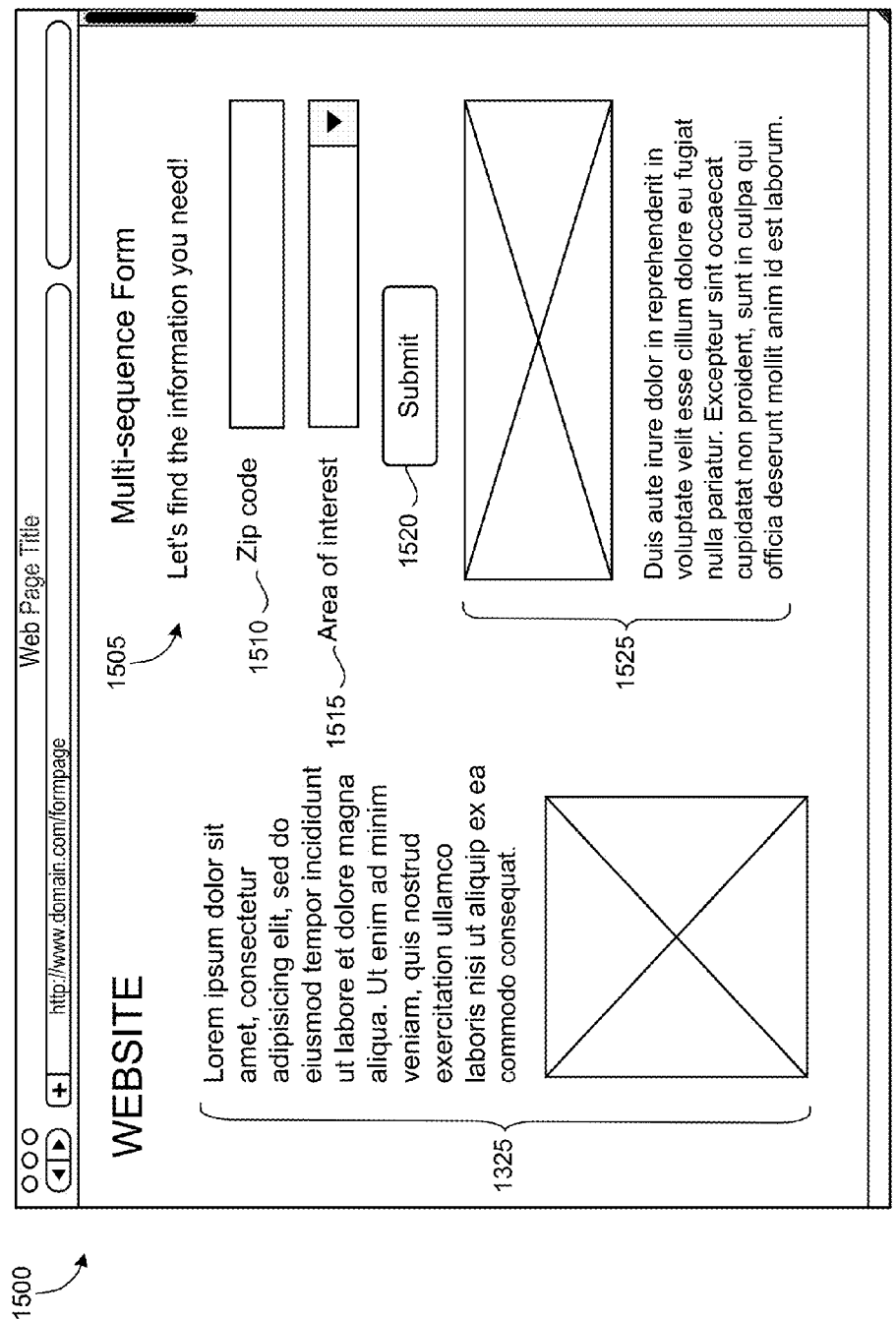
FIG. 15 illustrates an exemplary webpage including a first stage of a multi-sequence form.

FIG. 15 illustrates exemplary webpage 1500 including a first stage of multi-sequence form 1505. Similar to original webpage 1300, updated webpage 1500 includes content 1325. In place of original form 1305, however, updated webpage 1500 includes multi-sequence form 1505, which displays one stage of multi-sequence form 1505 at a time. Multi-sequence form 1505 includes two input areas (and corresponding labels) 1510 and 1515. As described above, an order of multi-sequence form 1505 may be based upon input area type. Input area for a zip code 1510 and input area for an area of interest 1515 represent input areas with a high likelihood of user completion and submission. Submit button 1520 enables the user to submit data inputted within input areas 1510 and 1515. Additionally, updated webpage 1500 includes additional content 1525. Given that multi-sequence form 1505 requires less space than original form 1305, the layout of updated webpage 1500 has been modified (as described herein) to fill the now vacant space with additional content 1525.

Figure 16:
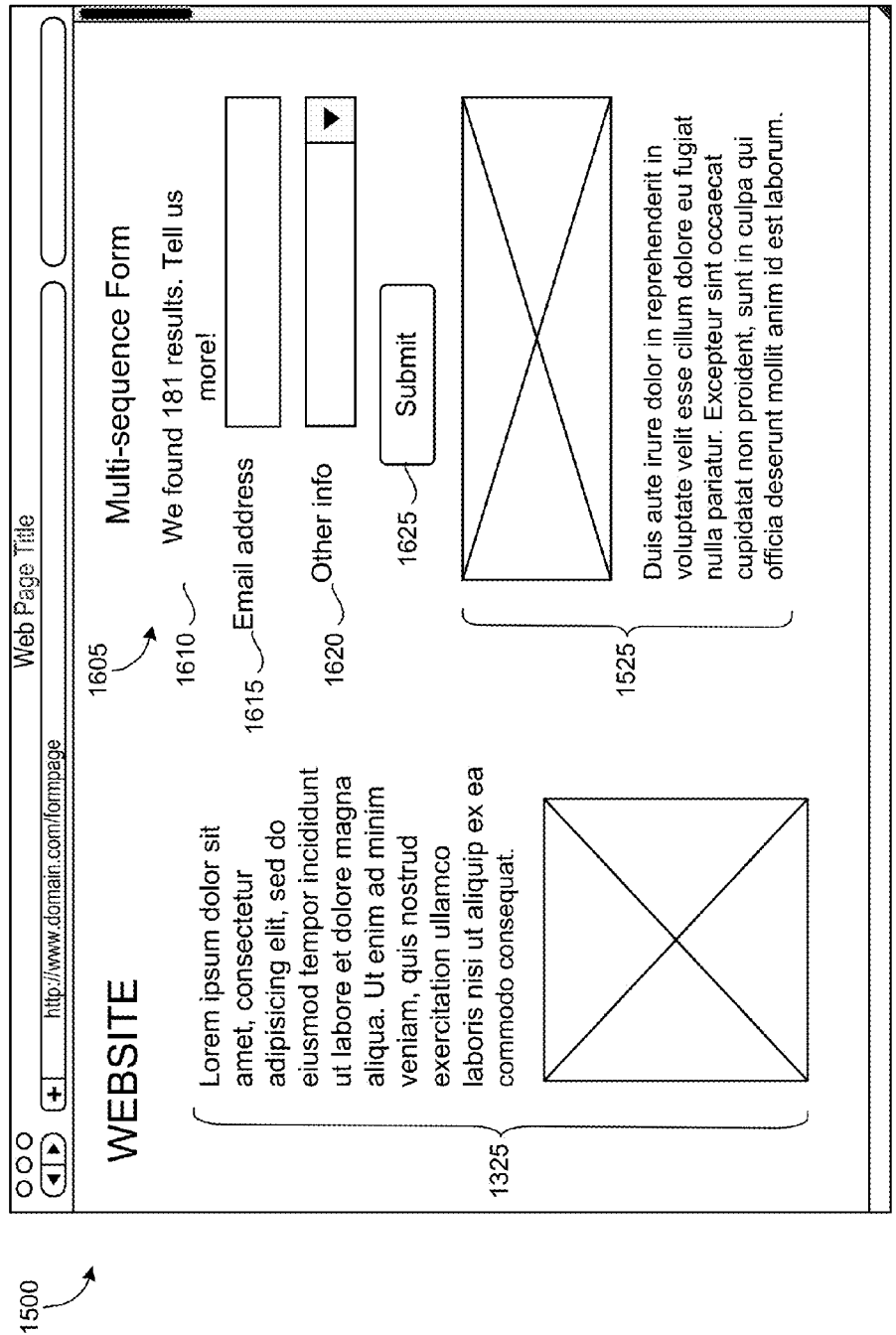
FIG. 16 illustrates an exemplary webpage including a second stage of the multi-sequence form.

FIG. 16 illustrates exemplary webpage 1500 including a second stage of multi-sequence form 1605. Updated webpage 1500 continues to include content 1325 and additional content 1525. The multi-sequence form 1605, however, has been updated in response to receiving submission of completed input areas 1510 and 1515 in the previous stage of multi-sequence form 1505. The second stage of multi-sequence form 1605 includes a description of or metadata for query results 1610. For example, descriptive results 1610 provide a user with an indication that 181 results were found in response to a query using the completed and submitted zip code input area 1510 and completed and submitted area of interest input area 1515. Descriptive results 1610 provide an incentive to continue completing and submitting stages of the multi-sequence form without revealing the actual content of value to the user. Submit button 1625 enables the user to submit data inputted within input areas 1615 and 1620.

Figure 17:
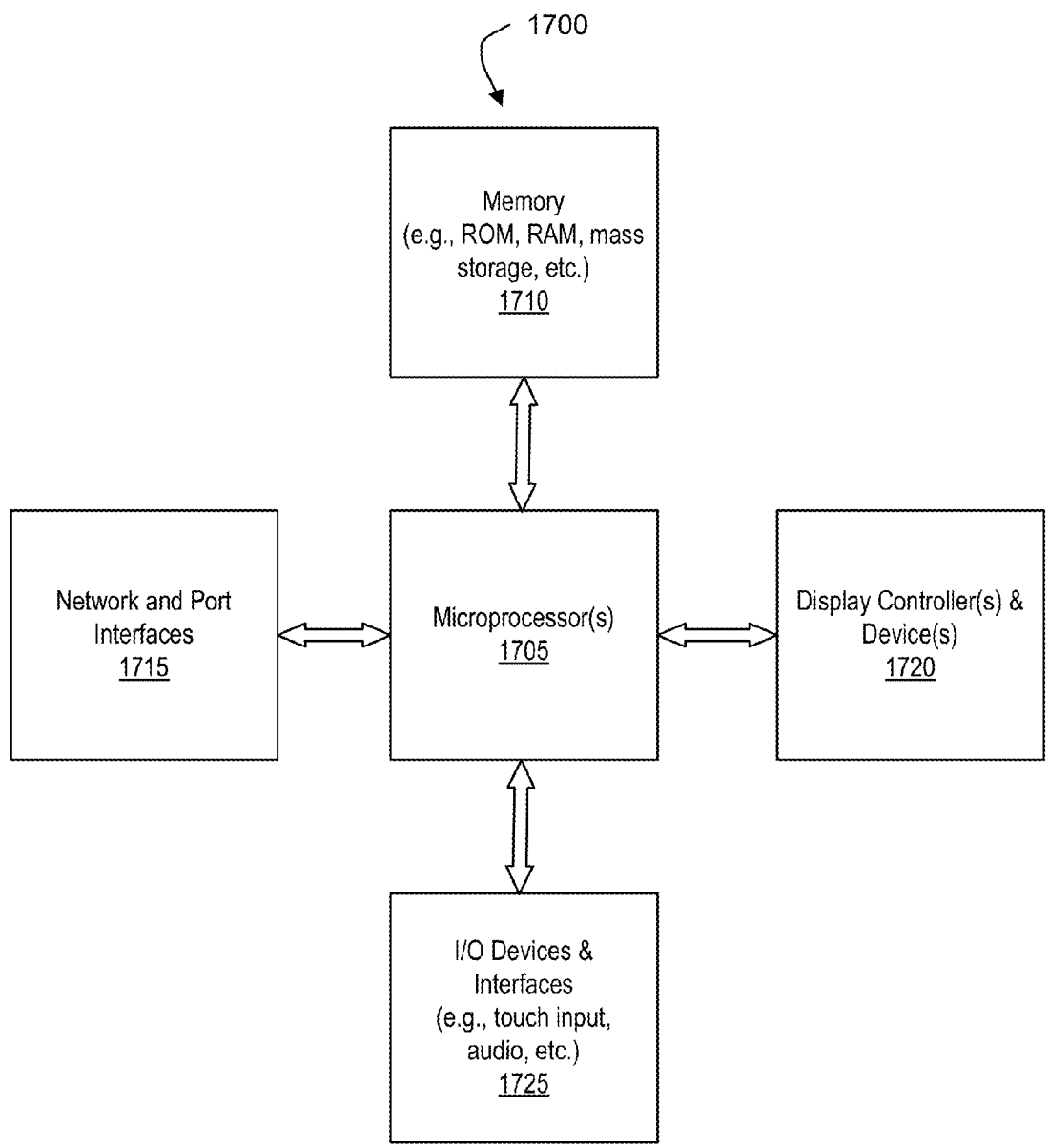
FIG. 17 illustrates, in block diagram form, an exemplary processing system to implement webpage form optimization.

FIG. 17 illustrates, in block diagram form, exemplary processing system 1700 to perform webpage form optimization. Data processing system 1700 includes one or more microprocessors 1705 and connected system components (e.g., multiple connected chips). Alternatively, data processing system 1700 is a system on a chip.

Data processing system 1700 includes memory 1710, which is coupled to microprocessor(s) 1705. Memory 1710 may be used for storing data, metadata, and programs for execution by the microprocessor(s) 1705. Memory 1710 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1710 may be internal or distributed memory.

Data processing system 1700 includes network and port interfaces 1715, such as a port, connector for a dock, or a connector for a USB interface, FireWire, Thunderbolt, Ethernet, Fibre Channel, etc. to connect the system 1700 with another device, external component, or a network. Exemplary network and port interfaces 1715 also include wireless transceivers, such as an I15 802.11 transceiver, an infrared transceiver, a Bluetooth transceiver, a wireless cellular telephony transceiver (e.g., 2G, 3G, 4G, etc.), or another wireless protocol to connect data processing system 1700 with another device, external component, or a network and receive stored instructions, data, tokens, etc.

Data processing system 1700 also includes display controller and display device 1720 and one or more input or output ("I/O") devices and interfaces 1725. Display controller and display device 1720 provides a visual user interface for the user. I/O devices 1725 allow a user to provide input to, receive output from, and otherwise transfer data to and from the system. I/O devices 1725 may include a mouse, keypad or a keyboard, a touch panel or a multi-touch input panel, camera, optical scanner, audio input/output (e.g., microphone and/or a speaker), other known I/O devices or a combination of such I/O devices.

It will be appreciated that one or more buses, may be used to interconnect the various components shown in FIG. 17.

Data processing system 1700 is an exemplary representation of one or more of client device(s) 105, web server 115, storage device(s) 120, optimization server 110, and storage device(s) 130 described above. Data processing system 1700 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 1700 may be a network computer, server, or an embedded processing device within another device or consumer electronic product. As used herein, the terms computer, device, system, processing system, processing device, and "apparatus comprising a processing device" may be used interchangeably with data processing system 1700 and include the above-listed exemplary embodiments.

It will be appreciated that additional components, not shown, may also be part of data processing system 1700, and, in certain embodiments, fewer components than that shown in FIG. 17 may also be used in data processing system 1700. It will be apparent from this description that aspects of the inventions may be embodied, at least in part, in software. That is, the computer-implemented methods described herein may be carried out in a computer system or other data processing system 1700 in response to its processor or processing system 1705 executing sequences of instructions contained in a memory, such as memory 1710 or other non-transitory machine-readable storage medium. The software may further be transmitted or received over a network (not shown) via network interface device 1715. In various embodiments, hardwired circuitry may be used in combination with the software instructions to implement the present embodiments. Thus, the techniques are not limited to any specific combination of hardware circuitry and software, or to any particular source for the instructions executed by data processing system 1700.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method executed by a computing device, comprising:
   parsing a set of one or more web pages of a website;
   generating a first plurality of n-grams based on at least content that is included on the set of one or more web pages, wherein n is at least two;
   determining a relevancy value for each of the first plurality of n-grams;
   generating a second plurality of n-grams based on at least removing any of the first plurality of n-grams whose corresponding relevancy value is below a relevancy value threshold;
   for each one of the second plurality of n-grams, determining whether that one of the second plurality of n-grams is similar to another one of the second plurality of n-grams,
   generating a third plurality of n-grams based on at least removing any of those second plurality of n-grams that have been determined as being similar to another one of the second plurality of n-grams;
   for at least one of the third plurality of n-grams, determining whether there is at least one of the set of web pages of the website that that is directed at content regarding that n-gram; and
   responsive to determining that there is not at least one of the set of web pages of the website that is directed at content regarding the at least one of the third plurality of n-grams, performing the following:
   automatically creating a web page with content directed at the at least one of the third plurality of n-grams, wherein automatically creating the web page includes,
      using a same template of the website for the created web page,
      inserting content into the created web page with existing content of the website that is related to the at least one of the third plurality of n-grams, and
      adding a title for the created web page based on the at least one of the third plurality of n-grams;
   providing the created web page in a graphical editor for a user to review the created web page; and
   creating a set of one or more links to the reviewed and created web page on one or more of the set of web pages of the website so that the created web page is not an orphan web page.

2. The method of claim 1, wherein generating the first plurality of n-grams further is based on content that is included on a set of one or more web pages of one or more competitors of the website.

3. The method of claim 1, wherein generating the first plurality of n-grams further is based on results of issuing search queries using content included in the set of web pages of the website.

4. The method of claim 1, wherein determining the relevancy value for each of the first plurality of n-grams includes:
   determining whether that n-gram is common across other websites that are not competitors of the website, wherein an n-gram that is common across other websites has less relevance than an n-gram that is not common across other websites that are not competitors of the website; and determining a frequency of that n-gram appearing in a plurality of competitors the website, wherein an n-gram that has a frequency under a frequency threshold for a threshold number of the plurality of competitors has less relevance than an n-gram that has a frequency that over the frequency threshold for the threshold number of the plurality of competitors.

5. The method of claim 1, wherein determining the relevancy value for each of the first plurality of n-grams includes performing a term frequency-inverse document frequency (TF-IDF) on each of those n-grams.

6. The method of claim 1, wherein determining whether there is at least one of the set of web pages of the website that that is directed at content regarding that n-gram includes analyzing the parsed set of web pages of the website including, determining whether that n-gram is included in a URL of one of the parsed set of web pages;

determining whether that n-gram is included in a title of one of the parsed set of web pages; and determining whether that n-gram is included with a frequency over a threshold of a web page.

7. The method of claim 1, further comprising:

for at least one of the third plurality of n-grams, issuing a search query to at least one search engine based on that n-gram;

analyzing a set of one or more results of that issued search query to determine whether the website is included in that set of results;

determining that the website is not included in the set of results; and responsive to that determination, taking one or more actions to improve a search ranking of the website for that n-gram.

8. The method of claim 1, further comprising:

classifying visitors of the website into at least two groups, wherein a first group represents visitors that are likely aware of the website prior to visiting the website;

comparing an average time that visitors from the first group stay on one of the web pages of the website during each visit with an average time that visitors from a second one of the at least two groups stay on that web page during each visit;

determining that the average time that the visitors from the second group stay on the web page during their visits is below a threshold percentage of the average time that the visitors from the first group stay on the web page during their visits; and responsive to that determination, taking one or more actions to improve the average time that future visitors of the second group will stay on the web page during their visits.

9. A non-transitory computer-readable medium storing instructions, which when executed by a set of one or more processors, cause the set of processors to perform operations comprising:

parsing a set of one or more web pages of a website;

generating a first plurality of n-grams based on at least content that is included on the set of one or more web pages, wherein n is at least two;

determining a relevancy value for each of the first plurality of n-grams;

generating a second plurality of n-grams based on at least removing any of the first plurality of n-grams whose corresponding relevancy value is below a relevancy value threshold;

for each one of the second plurality of n-grams, determining whether that one of the second plurality of n-grams is similar to another one of the second plurality of n-grams, generating a third plurality of n-grams based on at least removing any of those second plurality of n-grams that have been determined as being similar to another one of the second plurality of n-grams;

for at least one of the third plurality of n-grams, determining whether there is at least one of the set of web pages of the website that that is directed at content regarding that n-gram; and responsive to determining that there is not at least one of the set of web pages of the website that is directed at content regarding the at least one of the third plurality of n-grams, performing the following:

automatically creating a web page with content directed at the at least one of the third plurality of n-grams, wherein automatically creating the web page includes, using a same template of the website for the created web page, inserting content into the created web page with existing content of the website that is related to the at least one of the third plurality of n-grams, and adding a title for the created web page based on the at least one of the third plurality of n-grams;

providing the created web page in a graphical editor for a user to review the created web page; and creating a set of one or more links to the reviewed and created web page on one or more of the set of web pages of the website so that the created web page is not an orphan web page.

10. The non-transitory computer-readable medium of claim 9, wherein generating the first plurality of n-grams further is based on content that is included on a set of one or more web pages of one or more competitors of the website.

11. The non-transitory computer-readable medium of claim 9, wherein generating the first plurality of n-grams further is based on results of issuing search queries using content included in the set of web pages of the website.

12. The non-transitory computer-readable medium of claim 9, wherein determining the relevancy value for each of the first plurality of n-grams includes:

determining whether that n-gram is common across other websites that are not competitors of the website, wherein an n-gram that is common across other websites has less relevance than an n-gram that is not common across other websites that are not competitors of the website; and determining a frequency of that n-gram appearing in a plurality of competitors the website, wherein an n-gram that has a frequency under a frequency threshold for a threshold number of the plurality of competitors has less relevance than an n-gram that has a frequency that over the frequency threshold for the threshold number of the plurality of competitors.

13. The non-transitory computer-readable medium of claim 9, wherein determining the relevancy value for each of the first plurality of n-grams includes performing a term frequency-inverse document frequency (TF-IDF) on each of those n-grams.

14. The non-transitory computer-readable medium of claim 9, wherein determining whether there is at least one of the set of web pages of the website that that is directed at content regarding that n-gram includes analyzing the parsed set of web pages of the website including,
- determining whether that n-gram is included in a URL of one of the parsed set of web pages;
- determining whether that n-gram is included in a title of one of the parsed set of web pages; and
- determining whether that n-gram is included with a frequency over a threshold of a web page.

15. The non-transitory computer-readable medium of claim 9 further storing instructions that, when executed by the set of processors, cause the set of processors to perform the following operations:
- for at least one of the third plurality of n-grams, issuing a search query to at least one search engine based on that n-gram;
- analyzing a set of one or more results of that issued search query to determine whether the website is included in that set of results;
- determining that the website is not included in the set of results; and
- responsive to that determination, taking one or more actions to improve a search ranking of the website for that n-gram.

16. The non-transitory computer-readable medium of claim 9 further storing instructions that, when executed by the set of processors, cause the set of processors to perform the following operations:
- classifying visitors of the website into at least two groups, wherein a first group represents visitors that are likely aware of the website prior to visiting the website;
- comparing an average time that visitors from the first group stay on one of the web pages of the website during each visit with an average time that visitors from a second one of the at least two groups stay on that web page during each visit;
- determining that the average time that the visitors from the second group stay on the web page during their visits is below a threshold percentage of the average time that the visitors from the first group stay on the web page during their visits; and
- responsive to that determination, taking one or more actions to improve the average time that future visitors of the second group will stay on the web page during their visits.

17. An apparatus, comprising:
a set of one or more processors;
a set of one or more non-transitory computer-readable mediums that store instructions, that when executed by the set of processors, cause the set of processors to perform the following:
- parse a set of one or more web pages of a website;
- generate a first plurality of n-grams based on at least content that is included on the set of one or more web pages, wherein n is at least two;
- determine a relevancy value for each of the first plurality of n-grams;
- generate a second plurality of n-grams based on at least removing any of the first plurality of n-grams whose corresponding relevancy value is below a relevancy value threshold;
- for each one of the second plurality of n-grams, determine whether that one of the second plurality of n-grams is similar to another one of the second plurality of n-grams,
- generate a third plurality of n-grams based on at least removing any of those second plurality of n-grams that have been determined as being similar to another one of the second plurality of n-grams;
- for at least one of the third plurality of n-grams, determine whether there is at least one of the set of web pages of the website that that is directed at content regarding that n-gram;
- responsive to a determination that there is not at least one of the set of web pages of the website that is directed at content regarding the at least one of the third plurality of n-grams, perform the following:
  - automatically create a web page with content directed at the at least one of the third plurality of n-grams, wherein automatically creation of the web page includes the following,
    - use a same template of the website for the created web page,
    - insert content into the created web page with existing content of the website that is related to the at least one of the third plurality of n-grams, and
    - add a title for the created web page based on the at least one of the third plurality of n-grams;
  - provide the created web page in a graphical editor for a user to review the created web page; and
  - create a set of one or more links to the reviewed and created web page on one or more of the set of web pages of the website so that the created web page is not an orphan web page.

18. The apparatus of claim 17, wherein generation of the first plurality of n-grams further is based on content that is included on a set of one or more web pages of one or more competitors of the website.

19. The apparatus of claim 17, wherein generation the first plurality of n-grams further is based on results of issuing search queries using content included in the set of web pages of the website.

20. The apparatus of claim 17, wherein the determination of the relevancy value for each of the first plurality of n-grams includes performing the following:
- determine whether that n-gram is common across other websites that are not competitors of the website, wherein an n-gram that is common across other websites has less relevance than an n-gram that is not common across other websites that are not competitors of the website; and
- determine a frequency of that n-gram appearing in a plurality of competitors the website, wherein an n-gram that has a frequency under a frequency threshold for a threshold number of the plurality of competitors has less relevance than an n-gram that has a frequency that over the frequency threshold for the threshold number of the plurality of competitors.

21. The apparatus of claim 17, wherein the determination of the relevancy value for each of the first plurality of n-grams includes performing a term frequency-inverse document frequency (TF-IDF) on each of those n-grams.

22. The apparatus of claim 17, wherein the determination of whether there is at least one of the set of web pages of the website that that is directed at content regarding that n-gram includes analyzing the parsed set of web pages of the website including performing the following:
- determine whether that n-gram is included in a URL of one of the parsed set of web pages;
- determine whether that n-gram is included in a title of one of the parsed set of web pages; and determine whether that n-gram is included with a frequency over a threshold of a web page.

23. The apparatus of claim 17, wherein the set of non-transitory computer-readable mediums further stores instructions that, when executed by the set of processors, cause the set of processors to perform the following:
  for at least one of the third plurality of n-grams, issue a search query to at least one search engine based on that n-gram;
  analyze a set of one or more results of that issued search query to determine whether the website is included in that set of results;
  determine that the website is not included in the set of results; and
  responsive to that determination, take one or more actions to improve a search ranking of the website for that n-gram.

24. The apparatus of claim 17, wherein the set of non-transitory computer-readable mediums further stores instructions that, when executed by the set of processors, cause the set of processors to perform the following:
  classify visitors of the website into at least two groups, wherein a first group represents visitors that are likely aware of the website prior to visiting the website;
  compare an average time that visitors from the first group stay on one of the web pages of the website during each visit with an average time that visitors from a second one of the at least two groups stay on that web page during each visit;
  determine that the average time that the visitors from the second group stay on the web page during their visits is below a threshold percentage of the average time that the visitors from the first group stay on the web page during their visits; and
  responsive to that determination, take one or more actions to improve the average time that future visitors of the second group will stay on the web page during their visits.

\* \* \* \* \*